US012804011B2

(12) United States Patent
Broadworth et al.

(10) Patent No.: US 12,804,011 B2
(45) **Date of Patent: *Nov. 17, 2026**

(54) WEB SERVICE-BASED MONITORING AND DETECTION OF FRAUDULENT OR UNAUTHORIZED USE OF CALLING SERVICE

(71) Applicant: Level 3 Communications, LLC, Denver, CO (US)

(72) Inventors: Andrew J. Broadworth, Thornton, CO (US); Matthew McCarthy, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 71 days.

This patent is subject to a terminal disclaimer.

(21) Appl. No.: 19/041,475

(22) Filed: Jan. 30, 2025

(65) Prior Publication Data

US 2025/0175496 A1 May 29, 2025

Related U.S. Application Data

(63) Continuation of application No. 18/819,405, filed on Aug. 29, 2024, now Pat. No. 12,218,970, which is a continuation of application No. 18/241,580, filed on Sep. 1, 2023, now Pat. No. 12,081,586, which is a continuation of application No. 17/832,732, filed on Jun. 6, 2022, now Pat. No. 11,750,644, which is a (Continued)

(51) Int. Cl.
*H04L 9/40* (2022.01)
*H04L 65/4038* (2022.01)

(52) U.S. Cl.
CPC ...... *H04L 63/1458* (2013.01); *H04L 63/1416* (2013.01); *H04L 63/1466* (2013.01); *H04L 65/4038* (2013.01)

(58) Field of Classification Search
CPC ............. H04L 63/1458; H04L 63/1416; H04L 63/1466; H04L 65/4038
See application file for complete search history.

(56) References Cited

U.S. PATENT DOCUMENTS 6,442,248 B1 8/2002 Davis
7,227,933 B1 6/2007 Davis (Continued)

*Primary Examiner* — Stephen T Gundry

(57) ABSTRACT

Novel tools and techniques are provided for implementing web-based monitoring and detection of fraudulent or unauthorized use of voice calling service. In various embodiments, a computing system might receive, from a user device associated with an originating party, a request to initiate a call session with a destination party, the request comprising user information associated with the originating party and a destination number associated with the destination party; might query a database with session data (including user information) to access permission data and configuration data; and might configure fraud logic using received configuration data from the database. The computing system might analyze the session data and permission data using the configured fraud logic to determine whether the originating party is permitted to establish the requested call session with the destination party; if so, might initiate one or more first actions; and, if not, might initiate one or more second actions.

17 Claims, 13 Drawing Sheets

Related U.S. Application Data continuation of application No. 16/844,710, filed on Apr. 9, 2020, now Pat. No. 11,356,473.

(60) Provisional application No. 62/939,945, filed on Nov. 25, 2019.

(56) References Cited

U.S. PATENT DOCUMENTS

| | | | | |
|---|---|---|---|---|
| 7,440,558 | B2 | 10/2008 | Heilmann | |
| 8,806,630 | B2 | 8/2014 | Qiu | |
| 8,817,669 | B2 | 8/2014 | Walker | |
| 9,277,049 | B1 | 3/2016 | Danis | |
| 9,332,119 | B1 * | 5/2016 | Danis | H04M 3/436 |
| 9,419,988 | B2 | 8/2016 | Alexander | |
| 9,596,274 | B2 * | 3/2017 | Lawson | G06F 9/541 |
| 9,762,728 | B1 | 9/2017 | Cox | |
| 9,832,126 | B1 | 11/2017 | Davis | |
| 9,955,352 | B2 * | 4/2018 | Mahaffey | H04W 12/30 |
| 9,992,352 | B2 * | 6/2018 | Sharma | H04M 15/08 |
| 10,091,195 | B2 * | 10/2018 | Lindemann | H04L 63/0853 |
| 10,205,825 | B2 | 2/2019 | Dowlatkhah | |
| 10,230,838 | B2 * | 3/2019 | Hodge | H04M 7/1295 |
| 10,237,070 | B2 * | 3/2019 | Lindemann | H04L 9/3231 |
| 10,389,872 | B1 * | 8/2019 | Cox | H04M 3/382 |
| 10,560,583 | B2 | 2/2020 | Sharma | |
| 10,666,793 | B1 * | 5/2020 | Gardner | H04M 3/385 |
| 10,681,206 | B1 | 6/2020 | Kreiner | |
| 10,686,935 | B1 | 6/2020 | Parampottil | |
| 10,805,458 | B1 * | 10/2020 | Grabowski | H04M 3/53308 |
| 11,153,435 | B2 | 10/2021 | Grabowski | |
| 2002/0188712 | A1 * | 12/2002 | Caslin | G06Q 20/102 709/223 |
| 2004/0234056 | A1 * | 11/2004 | Heilmann | H04M 3/38 379/196 |
| 2007/0253553 | A1 | 11/2007 | Abdul Rahman | |
| 2008/0107248 | A1 | 5/2008 | Chen | |
| 2009/0288165 | A1 | 11/2009 | Qiu | |
| 2010/0235879 | A1 * | 9/2010 | Burnside | H04L 63/0263 709/224 |
| 2011/0274034 | A1 | 11/2011 | Rautiola | |
| 2013/0128883 | A1 * | 5/2013 | Lawson | G06F 9/541 370/352 |
| 2015/0026786 | A1 | 1/2015 | Alexander | |
| 2015/0088750 | A1 | 3/2015 | Dua | |
| 2015/0381666 | A1 | 12/2015 | Rustogi | |
| 2016/0066189 | A1 | 3/2016 | Mahaffrey | |
| 2016/0127569 | A1 * | 5/2016 | Karnas | G06F 16/24573 455/466 |
| 2016/0127808 | A1 | 5/2016 | Wong | |
| 2016/0366193 | A1 | 12/2016 | Lawson | |
| 2017/0180567 | A1 | 6/2017 | Sharma | |
| 2018/0249005 | A1 | 8/2018 | Dowlatkhah | |
| 2018/0249006 | A1 * | 8/2018 | Dowlatkhah | H04B 17/00 |
| 2019/0089840 | A1 * | 3/2019 | Amin | H04L 65/1096 |
| 2019/0158492 | A1 | 5/2019 | Zavesky | |
| 2019/0158663 | A1 | 5/2019 | Dowlathah | |
| 2019/0312979 | A1 * | 10/2019 | Sharma | G06F 16/24573 |
| 2020/0076957 | A1 | 3/2020 | Sharma | |
| 2020/0366719 | A1 * | 11/2020 | Uzelac | H04L 63/304 |
| 2020/0396221 | A1 * | 12/2020 | Shaffer | H04L 63/0876 |
| 2021/0037135 | A1 | 2/2021 | Meredith | |
| 2021/0092227 | A1 * | 3/2021 | Naujok | H04M 3/42034 |
| 2021/0092228 | A1 * | 3/2021 | Grabowski | H04M 7/006 |
| 2021/0160276 | A1 | 5/2021 | Broadworth | |
| 2022/0303307 | A1 | 9/2022 | Broadworth | |
| 2023/0412640 | A1 | 12/2023 | Broadworth | |
| 2024/0422193 | A1 | 12/2024 | Broadworth | |

* cited by examiner

400

WEB SERVICE-BASED MONITORING AND DETECTION OF FRAUDULENT OR UNAUTHORIZED USE OF CALLING SERVICE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing monitoring and detection of fraudulent or unauthorized use, and, more particularly, to methods, systems, and apparatuses for implementing web service-based monitoring and detection of fraudulent or unauthorized use of calling service.

BACKGROUND

In conventional calling systems or networks (e.g., voice communications systems, video communications systems, telephone conference systems, video conferencing systems, or multimedia communications systems, and/or the like), fraudulent and/or unauthorized usage is rampant and mostly unchecked. For example, in conventional calling systems or networks, it is difficult to identify fraudulent and/or unauthorized usage (e.g., users guessing a chairperson or leader code or personal identification number ("PIN") after already identifying a valid telephone conference account; a user(s) using the calling systems or networks to initiate bulk calls, robocalls, denial of service ("DoS") attacks; a user(s) using the calling systems or networks to hide their identity; a user(s) using the calling systems or networks to bypass long distance or other telephone charges; etc.).

Hence, there is a need for more robust and scalable solutions for implementing monitoring and detection of fraudulent or unauthorized use, and, more particularly, to methods, systems, and apparatuses for implementing web service-based monitoring and detection of fraudulent or unauthorized use of calling service.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
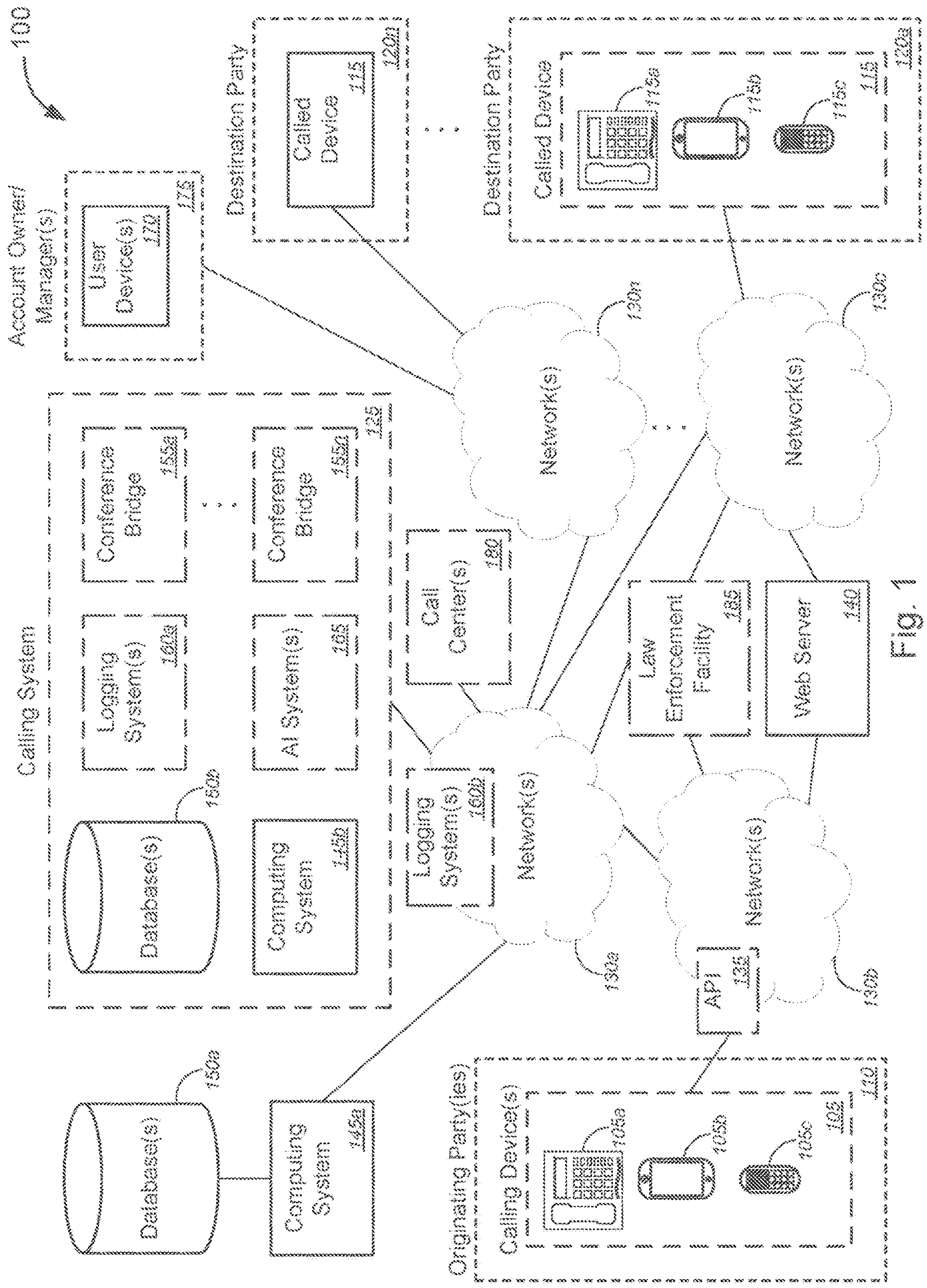
FIG. 1 is a schematic diagram illustrating a system for implementing web service-based monitoring and detection of fraudulent or unauthorized use of calling service, in accordance with various embodiments.

Various embodiments provide tools and techniques for implementing monitoring and detection of fraudulent or unauthorized use, and, more particularly, to methods, systems, and apparatuses for implementing web service-based monitoring and detection of fraudulent or unauthorized use of calling service.

In various embodiments, a computing system might receive, from a first user device associated with an originating party, a request to initiate a call session with a destination party, the request comprising user information associated with the originating party and a destination number associated with the destination party; might query a database with session data to access permission data and configuration data, the session data comprising the user information; might receive the permission data and the configuration data from the database; and might configure fraud logic using the received configuration data. The computing system might analyze the received session data and the received permission data using the configured fraud logic to determine whether the originating party is permitted to establish the requested call session with the destination party; based on a determination that the originating party is permitted to establish the requested call session with the destination party, might initiate one or more first actions; and, based on a determination that the originating party is not permitted to establish the requested call session with the destination party, might initiate one or more second actions.

In some embodiments, the call session might include, without limitation, at least one of a voice call session, a video call session, a teleconferencing call session, a video conferencing call session, or a multimedia call session, and/or the like. In some instances, the user information associated with the originating party might include, but is not limited to, at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of the calling system. In some cases, receiving the request to initiate the call session with the destination party might comprise receiving, with the computing system and from the first user device associated with the originating party via an application programming interface ("API"), the request to initiate the call session with the destination party. Alternatively, or additionally, receiving the request to initiate the call session with the destination party might comprise receiving, with the computing system and from the first user device associated with the originating party via a web service, the request to initiate the call session with the destination party.

According to some embodiments, determining whether the originating party is permitted to establish the requested call session with the destination party might comprise at least one of: determining based on the permission data whether the originating party has a history of at least one of fraudulent use or unauthorized use of the calling system; determining based on the permission data whether the originating party is blocked at a company level from establishing a dial out to the destination party; determining based on the permission data whether the originating party is blocked at an account level from establishing a dial out to the destination party; or determining based on the permission data whether a dial out to the destination party is explicitly allowed for a specific user account of the originating party; and/or the like.

In some embodiments, determining based on the permission data whether the originating party has a history of at least one of fraudulent use or unauthorized use of a calling system might comprise at least one of: determining whether the originating party has a history of excessive dialing for a single account; determining whether the originating party has a history of excessive dialing across multiple accounts; determining whether the originating party has a history of initiating denial of service ("DoS") type activities; determining whether a user account of the calling system that is used by the originating party to send the request to initiate the call session has a history of excessive dialing for a single account; determining whether the user account of the calling system that is used by the originating party to send the request to initiate the call session has a history of excessive dialing across multiple accounts; determining whether the user account of the calling system that is used by the originating party to send the request to initiate the call session has a history of initiating DOS type activities; determining whether a personal identification number ("PIN") or leader code associated with the user account of the calling system has been incorrectly entered more than a predetermined number of times (e.g., 5 times or 6 times, or the like; which is likely indicative of "PIN scanning" by an offending party trying to guess at the PIN or leader code after having already identified a valid account, or the like); determining whether an origination telephone number associated with the originating party does not match a telephone number associated with an account owner associated with the user account of the calling system; or determining whether the originating party is calling from a location that is different from geographic location associated with the account owner; and/or the like.

In some cases, determining based on the permission data whether the originating party has a history of at least one of fraudulent use or unauthorized use of a calling system might alternatively or additionally comprise at least one of: determining whether the originating party is attempting to hide its identity or to hide direct communications by the originating party; determining whether the originating party is attempting to bypass long distance charges; determining whether the originating party is using the calling system as a bulk call generator; determining whether the originating party is using the calling system as an originator of robocalls; determining whether the originating party is using the calling system as part of a denial of service ("DoS") attack; determining whether a number of out-dials from a single user account of the calling system exceeds a predetermined threshold number of calls within a predetermined period; determining whether the originating party is calling from a location that has a known propensity for initiating fraudulent calls; determining whether the originating party is located in a foreign country; determining whether the destination party is located in a foreign country; or utilizing at least one of an artificial intelligence ("AI") system or a machine learning system to determine whether the call session requested by the originating party constitutes at least one of fraudulent use or unauthorized use of the calling system; and/or the like.

According to some embodiments, initiating the one or more first actions might include, but is not limited to, at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party; and/or the like.

In some embodiments, initiating the one or more second actions might include, without limitation, at least one of: sending a message to the first user device indicating that the call session between the originating party and the destination party is denied; denying the call session from being established between the first user device associated with the originating party and a second user device associated with the destination party; blocking initiation of the call session between the first user device associated with the originating party and the second user device associated with the destination party; sending instructions to a call connection system to deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system.

In various aspects, the web service-based monitoring and detection of fraudulent or unauthorized use of calling service might allow for optimized monitoring and tracking of usage of calling systems (e.g., voice communications systems, video communications systems, telephone conference systems, video conferencing systems, or multimedia communications systems, and/or the like) to detect fraudulent or unauthorized usage and to implement actions to address the detected fraudulent or unauthorized usage, and/or the like.

These and other aspects of the web service-based monitoring and detection of fraudulent or unauthorized use of calling service are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, teleconferencing or telephone conferencing technology, telephone conference or voice network monitoring technology, call connection technology, call monitoring technology, and/or the like. In other aspects, certain embodiments, can improve the functioning of user equipment or systems themselves (e.g., teleconferencing or telephone conferencing systems, telephone conference or voice network monitoring systems, call connection system, call monitoring system, etc.), for example, by receiving, with a computing system of a calling system and from a first user device associated with an originating party, a request to initiate a call session with a destination party, the request comprising user information associated with the originating party and a destination number associated with the destination party; querying, with the computing system, a database with session data to access permission data and configuration data, the session data comprising the user information; receiving, with the computing system, the permission data and the configuration data from the database; configuring, with the computing system, fraud logic using the received configuration data; analyzing, with the computing system, the received session data and the received permission data using the configured fraud logic to determine whether the originating party is permitted to establish the requested call session with the destination party; based on a determination that the originating party is permitted to establish the requested call session with the destination party, initiating one or more first actions; and based on a determination that the originating party is not permitted to establish the requested call session with the destination party, initiating one or more second actions; and/or the like.

In particular, to the extent any abstract concepts are present in the various embodiments, those concepts can be implemented as described herein by devices, software, systems, and methods that involve specific novel functionality (e.g., steps or operations), such as, by receiving, with a computing system of a calling system and from a first user device associated with an originating party, a request to initiate a call session with a destination party, the request comprising user information associated with the originating party and a destination number associated with the destination party; querying, with the computing system, a database with session data to access permission data and configuration data, the session data comprising the user information; receiving, with the computing system, the permission data and the configuration data from the database; configuring, with the computing system, fraud logic using the received configuration data; analyzing, with the computing system, the received session data and the received permission data using the configured fraud logic to determine whether the originating party is permitted to establish the requested call session with the destination party; based on a determination that the originating party is permitted to establish the requested call session with the destination party, initiating one or more first actions; and based on a determination that the originating party is not permitted to establish the requested call session with the destination party, initiating one or more second actions; and/or the like, to name a few examples, that extend beyond mere conventional computer processing operations. These functionalities can produce tangible results outside of the implementing computer system, including, merely by way of example, optimized monitoring and tracking of usage of calling systems or telephone conference systems or voice networks to detect fraudulent or unauthorized usage and to implement actions to address the detected fraudulent or unauthorized usage, and/or the like, at least some of which may be observed or measured by customers and/or service providers.

In an aspect, a method might comprise receiving, with a computing system of a calling system and from a first user device associated with an originating party, a request to initiate a call session with a destination party, the request comprising user information associated with the originating party and a destination number associated with the destination party; querying, with the computing system, a database with session data to access permission data and configuration data, the session data comprising the user information;

receiving, with the computing system, the permission data and the configuration data from the database; configuring, with the computing system, fraud logic using the received configuration data; analyzing, with the computing system, the received session data and the received permission data using the configured fraud logic to determine whether the originating party is permitted to establish the requested call session with the destination party; based on a determination that the originating party is permitted to establish the requested call session with the destination party, initiating one or more first actions; and based on a determination that the originating party is not permitted to establish the requested call session with the destination party, initiating one or more second actions.

In some embodiments, the computing system might comprise at least one of a call server, a network switch, a network hub, a network node, a voice communications system, a video communications system, a multimedia communications system, or a teleconferencing system. In some instances, the call session might comprise at least one of a voice call session, a video call session, a teleconferencing call session, a video conferencing call session, or a multimedia call session. In some cases, the user information associated with the originating party might comprise at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of the calling system.

According to some embodiments, receiving the request to initiate the call session with the destination party might comprise receiving, with the computing system and from the first user device associated with the originating party via an application programming interface ("API"), the request to initiate the call session with the destination party. Alternatively, or additionally, receiving the request to initiate the call session with the destination party might comprise receiving, with the computing system and from the first user device associated with the originating party via a web service, the request to initiate the call session with the destination party.

In some embodiments, determining whether the originating party is permitted to establish the requested call session with the destination party might comprise at least one of: determining based on the permission data whether the originating party has a history of at least one of fraudulent use or unauthorized use of the calling system; determining based on the permission data whether the originating party is blocked at a company level from establishing a dial out to the destination party; determining based on the permission data whether the originating party is blocked at an account level from establishing a dial out to the destination party; or determining based on the permission data whether a dial out to the destination party is explicitly allowed for a specific user account of the originating party; and/or the like.

Merely by way of example, in some cases, determining based on the permission data whether the originating party has a history of at least one of fraudulent use or unauthorized use of a calling system might comprise at least one of: determining whether the originating party has a history of excessive dialing for a single account; determining whether the originating party has a history of excessive dialing across multiple accounts; determining whether the originating party has a history of initiating denial of service ("DoS") type activities; determining whether a user account of the calling system that is used by the originating party to send the request to initiate the call session has a history of excessive dialing for a single account; determining whether the user account of the calling system that is used by the originating party to send the request to initiate the call session has a history of excessive dialing across multiple accounts; determining whether the user account of the calling system that is used by the originating party to send the request to initiate the call session has a history of initiating DOS type activities; determining whether a personal identification number ("PIN") or leader code associated with the user account of the calling system has been incorrectly entered more than a predetermined number of times; determining whether an origination telephone number associated with the originating party does not match a telephone number associated with an account owner associated with the user account of the calling system; or determining whether the originating party is calling from a location that is different from geographic location associated with the account owner; and/or the like.

In some embodiments, determining based on the permission data whether the originating party has a history of at least one of fraudulent use or unauthorized use of a calling system might alternatively, or additionally, comprise at least one of: determining whether the originating party is attempting to hide its identity or to hide direct communications by the originating party; determining whether the originating party is attempting to bypass long distance charges; determining whether the originating party is using the calling system as a bulk call generator; determining whether the originating party is using the calling system as an originator of robocalls; determining whether the originating party is using the calling system as part of a denial of service ("DoS") attack; determining whether a number of out-dials from a single user account of the calling system exceeds a predetermined threshold number of calls within a predetermined period; determining whether the originating party is calling from a location that has a known propensity for initiating fraudulent calls; determining whether the originating party is located in a foreign country; or determining whether the destination party is located in a foreign country. In some cases, determining based on the permission data whether the originating party has a history of at least one of fraudulent use or unauthorized use of a calling system might alternatively, or additionally, comprise utilizing at least one of an artificial intelligence ("AI") system or a machine learning system to determine whether the call session requested by the originating party constitutes at least one of fraudulent use or unauthorized use of the calling system.

According to some embodiments, initiating the one or more first actions might comprise at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party.

In some embodiments, initiating the one or more second actions might comprise at least one of: sending a message to the first user device indicating that the call session between the originating party and the destination party is denied; denying the call session from being established between the first user device associated with the originating party and a second user device associated with the destination party;

blocking initiation of the call session between the first user device associated with the originating party and the second user device associated with the destination party; sending instructions to a call connection system to deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a first user device associated with a originating party, a request to initiate a call session with a destination party, the request comprising user information associated with the originating party and a destination number associated with the destination party; query a database with session data to access permission data and configuration data, the session data comprising the user information; receive the permission data and the configuration data from the database; configure fraud logic using the received configuration data; analyze the received session data and the received permission data using the configured fraud logic to determine whether the originating party is permitted to establish the requested call session with the destination party; based on a determination that the originating party is permitted to establish the requested call session with the destination party, initiate one or more first actions; and based on a determination that the originating party is not permitted to establish the requested call session with the destination party, initiate one or more second actions.

In yet another aspect, a system might comprise a computing system of a calling system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a first user device associated with a originating party, a request to initiate a call session with a destination party, the request comprising user information associated with the originating party and a destination number associated with the destination party; query a database with session data to access permission data and configuration data, the session data comprising the user information; receive the permission data and the configuration data from the database; configure fraud logic using the received configuration data; analyze the received session data and the received permission data using the configured fraud logic to determine whether the originating party is permitted to establish the requested call session with the destination party; based on a determination that the originating party is permitted to establish the requested call session with the destination party, initiate one or more first actions; and based on a determination that the originating party is not permitted to establish the requested call session with the destination party, initiate one or more second actions.

In some embodiments, the computing system might comprise at least one of a call server, a network switch, a network hub, a network node, a voice communications system, a video communications system, a multimedia communications system, or a teleconferencing system, and/or the like. In some cases, the call session might comprise at least one of a voice call session, a video call session, a teleconferencing call session, a video conferencing call session, or a multimedia call session, and/or the like. In some instances, the user information associated with the originating party might comprise at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of the calling system.

According to some embodiments, determining based on the permission data whether the originating party has a history of at least one of fraudulent use or unauthorized use of a telephone conferencing system or a voice network might comprise utilizing at least one of an artificial intelligence ("AI") system or a machine learning system to determine whether the call session requested by the originating party constitutes at least one of fraudulent use or unauthorized use of the calling system.

In some embodiments, the one or more first actions might comprise at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party.

According to some embodiments, the one or more second actions might comprise at least one of: sending a message to the first user device indicating that the call session between the originating party and the destination party is denied; denying the call session from being established between the first user device associated with the originating party and a second user device associated with the destination party; blocking initiation of the call session between the first user device associated with the originating party and the second user device associated with the destination party; sending instructions to a call connection system deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing monitoring and detection of fraudulent or unauthorized use, and, more particularly, to methods, systems, and apparatuses for implementing web service-based monitoring and detection of fraudulent or unauthorized use of calling service, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing web service-based monitoring and detection of fraudulent or unauthorized use of calling service, in accordance with various embodiments.

In the non-limiting embodiment of FIG. 1, system 100 might comprise one or more calling devices 105 that are associated with or used by corresponding one or more originating parties 110 to initiate a call or call session with one or more called devices 115 that are associated with or used by corresponding one or more destination parties **120*a*-120*n* (collectively, "destination parties 120" or the like) using a calling system or telephone conference system or voice network 125 over one or more networks 130*a*-130*n* (collectively, "networks 130" or the like). According to some embodiments, the call or call session might be a call or call session between two parties or among three or more parties over a conference platform, such as a conference bridge or the like provided by the calling system or telephone conference system or voice network 125, and may include, without limitation, at least one of a voice call session, a video call session, a teleconferencing call session, a video conferencing call session, a multimedia call session, a voice only conference call, a video conference call (with voice functionality), a voice over Internet protocol ("VoIP") conference call, a web-based or Internet based video conference call, and/or the like. The one or more calling devices 105 might include, but is not limited to, at least one of a telephone 105*a*, a smart phone 105*b*, a mobile phone 105*c*, a tablet computer (not shown), a laptop computer (not shown), a wearable device (not shown), or the like. Similarly, the one or more called devices might include, without limitation, at least one of a telephone 115*a*, a smart phone 115*b*, a mobile phone 115*c***, a tablet computer (not shown), a laptop computer (not shown), a wearable device (not shown), or the like.

In some cases, the one or more networks 130 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 130 might include an access network of the service provider (e.g., an Internet service provider ("ISP")). In another embodiment, the network(s) 130 might include a core network of the service provider, and/or the Internet.

In some embodiments, system 100 might further comprise computing system **145*a* and corresponding database(s) 150*a* as well as computing system 145*b* and corresponding database(s) 150*b*. Computing system 145*a* and corresponding database(s) 150*a* might be disposed external to calling system or telephone conference system or voice network 125, while computing system 145*b* and corresponding database(s) 150*b* might be disposed within calling system or telephone conference system or voice network 125. System 100 might further comprise one or more conference bridges 155*a*-155*n* (optional; collectively, "conference bridges 155" or the like), one or more logging systems 160*a* (optional), and one or more artificial intelligence ("AI") systems 165 (optional), each of which may be disposed within calling system or telephone conference system or voice network 125. System 100 might further comprise one or more logging systems 160***b* (optional) that may be disposed external to calling system or telephone conference system or voice network 125, in some cases, disposed within a first network 130*a*, or the like. In some instances, the computing system 145*a* and/or 145*b* might include, but is not limited to, at least one of a call server, a network switch, a network hub, a network node, a voice communications system, a video communications system, a multimedia communications system, or a teleconferencing system, and/or the like.

System 100 might further comprise one or more user devices 170 associated with corresponding one or more account owners or account managers 175, one or more call centers 180 (or call center representatives or user devices associated with or used by call center representatives) (optional), and one or more law enforcement facilities 185 (or law enforcement representatives or user devices associated with or used by law enforcement representatives) (optional), or the like. Herein, although some components of system 100 are indicated as being optional while others are not, this is merely for the particular embodiment as shown, and, in other embodiments, one or more of the former set of components (or components indicated as being "optional") may be required while one or more of the latter set of components (or components not indicated as being "optional") may in fact be optional.

In operation, computing system 145*a*, computing system 145*b*, web server 140, or a monitoring system (such as monitoring system or web server 335 of FIG. 3, or the like) (collectively, "computing system" or the like) might receive, from a first user device 105 associated with an originating party (e.g., originating party 110, or the like), a request to initiate a call session with a destination party (e.g., destination party 120, or the like), the request comprising user information associated with the originating party and a destination number associated with the destination party; might query a database (e.g., database(s) 150*a* or 150*b*, or the like) with session data to access permission data and configuration data, the session data comprising the user information; might receive the permission data and the configuration data from the database; and might configure fraud logic using the received configuration data. The computing system might analyze the received session data and the received permission data using the configured fraud logic to determine whether the originating party is permitted to establish the requested call session with the destination party; based on a determination that the originating party is permitted to establish the requested call session with the destination party, might initiate one or more first actions; and, based on a determination that the originating party is not permitted to establish the requested call session with the destination party, might initiate one or more second actions.

In some embodiments, the call session might include, without limitation, at least one of a voice call session, a video call session, a teleconferencing call session, a video conferencing call session, or a multimedia call session, and/or the like. In some instances, the user information associated with the originating party might include, but is not limited to, at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of a calling system (e.g., the calling system 125, or the like). In some cases, receiving the request to initiate the call session with the destination party might comprise receiving, with the computing system and from the first user device associated with the originating party via an application programming interface ("API") (e.g., API 135, or the like), the request to initiate the call session with the destination party. Alternatively, or additionally, receiving the request to initiate the call session with the destination party might comprise receiving, with the computing system and from the first user device 105 associated with the originating party via a web service (e.g., using web server 140, or the like), the request to initiate the call session with the destination party.

According to some embodiments, determining whether the originating party is permitted to establish the requested call session with the destination party might comprise at least one of: determining based on the permission data whether the originating party has a history of at least one of fraudulent use or unauthorized use of the calling system; determining based on the permission data whether the originating party is blocked at a company level from establishing a dial out to the destination party; determining based on the permission data whether the originating party is blocked at an account level from establishing a dial out to the destination party; or determining based on the permission data whether a dial out to the destination party is explicitly allowed for a specific user account of the originating party; and/or the like.

In some embodiments, determining based on the permission data whether the originating party has a history of at least one of fraudulent use or unauthorized use of the calling system might comprise at least one of: determining whether the originating party has a history of excessive dialing for a single account; determining whether the originating party has a history of excessive dialing across multiple accounts; determining whether the originating party has a history of initiating denial of service ("DoS") type activities; determining whether a user account of the calling system that is used by the originating party to send the request to initiate the call session has a history of excessive dialing for a single account; determining whether the user account of the calling system that is used by the originating party to send the request to initiate the call session has a history of excessive dialing across multiple accounts; determining whether the user account of the calling system that is used by the originating party to send the request to initiate the call session has a history of initiating DOS type activities; determining whether a personal identification number ("PIN") or leader code associated with the user account of the calling system has been incorrectly entered more than a predetermined number of times (e.g., 5 times or 6 times, or the like; which is likely indicative of "PIN scanning" by an offending party trying to guess at the PIN or leader code after having already identified a valid account, or the like); determining whether an origination telephone number associated with the originating party does not match a telephone number associated with an account owner associated with the user account of the calling system; or determining whether the originating party is calling from a location that is different from geographic location associated with the account owner; and/or the like.

In some cases, determining based on the permission data whether the originating party has a history of at least one of fraudulent use or unauthorized use of the calling system might alternatively or additionally comprise at least one of: determining whether the originating party is attempting to hide its identity or to hide direct communications by the originating party; determining whether the originating party is attempting to bypass long distance charges; determining whether the originating party is using the calling system as a bulk call generator; determining whether the originating party is using the calling system as an originator of robo-calls; determining whether the originating party is using the calling system as part of a denial of service ("DoS") attack; determining whether a number of out-dials from a single user account of the calling system exceeds a predetermined threshold number of calls within a predetermined period; determining whether the originating party is calling from a location that has a known propensity for initiating fraudulent calls; determining whether the originating party is located in a foreign country; determining whether the destination party is located in a foreign country; or utilizing at least one of an artificial intelligence ("AI") system or a machine learning system to determine whether the call session requested by the originating party constitutes at least one of fraudulent use or unauthorized use of the calling system; and/or the like. Any or all of these determinations may result in the call being flagged for further investigation by the computing system or by a person(s) alerted by the computing system. For example, if the number of times of dial-out or call-out exceeds a threshold amount (e.g., 20 times in one day, for instance, although not limited to such an amount), the system might flag the activity for further investigation by the computing system or by the person(s) alerted by the computing system. A more sensitive threshold amount may be set for activity that is focused on a single destination number or single destination party, or the like.

According to some embodiments, initiating the one or more first actions might include, but is not limited to, at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party; and/or the like.

In some embodiments, initiating the one or more second actions might include, without limitation, at least one of: sending a message to the first user device indicating that the call session between the originating party and the destination party is denied; denying the call session from being established between the first user device associated with the originating party and a second user device associated with the destination party; blocking initiation of the call session between the first user device associated with the originating party and the second user device associated with the destination party; sending instructions to a call connection system to deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system.

These and other functions of the system 100 (and its components) are described in greater detail below with respect to FIGS. 2-4.

Figure 2A:
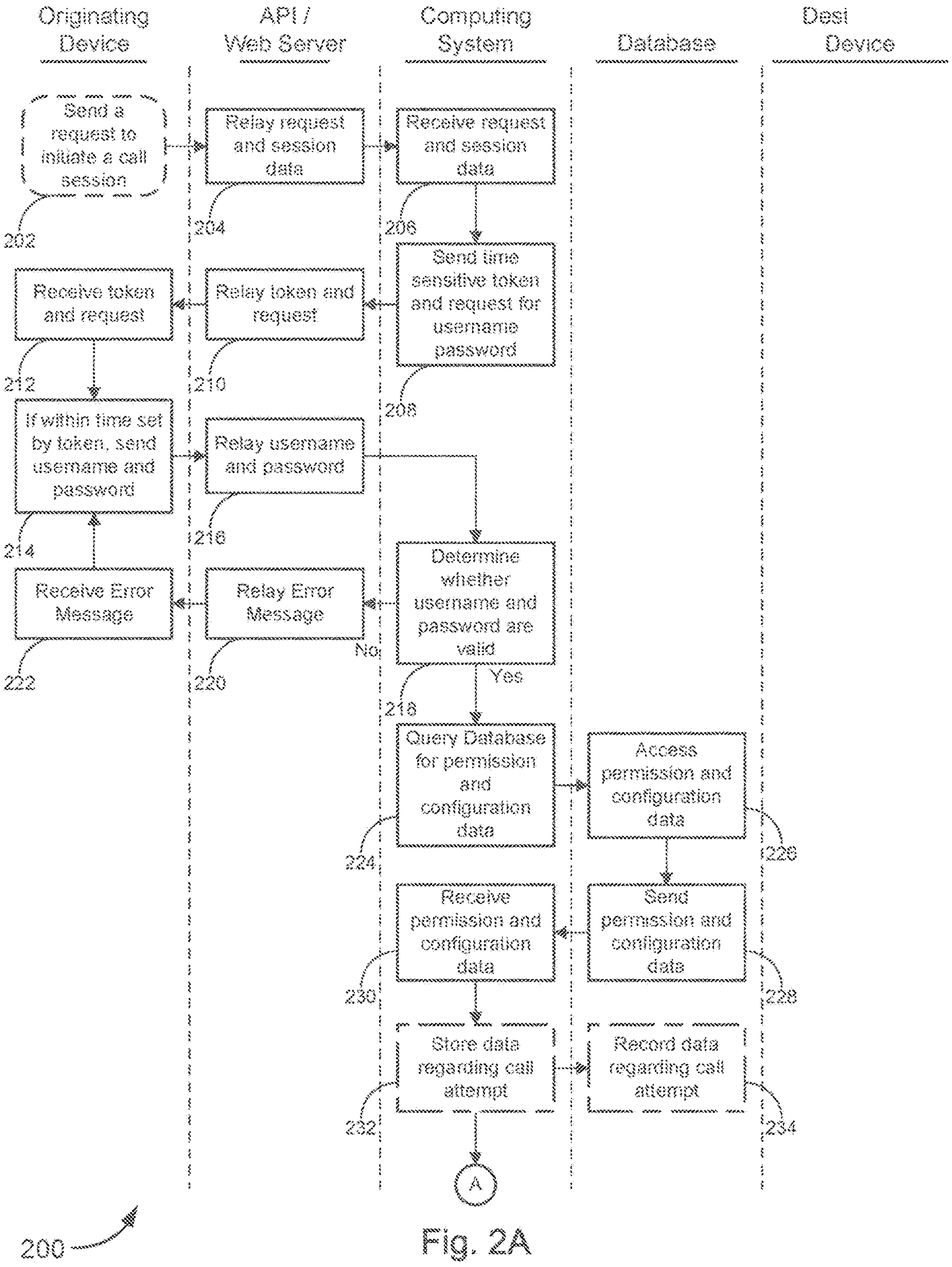
FIGS. 2A and 2B represent a system flow diagram illustrating a non-limiting example of the processes performed at or by components of the system in order to implement web service-based monitoring and detection of fraudulent or unauthorized use of calling service may be implemented, in accordance with various embodiments.
Figure 2B:
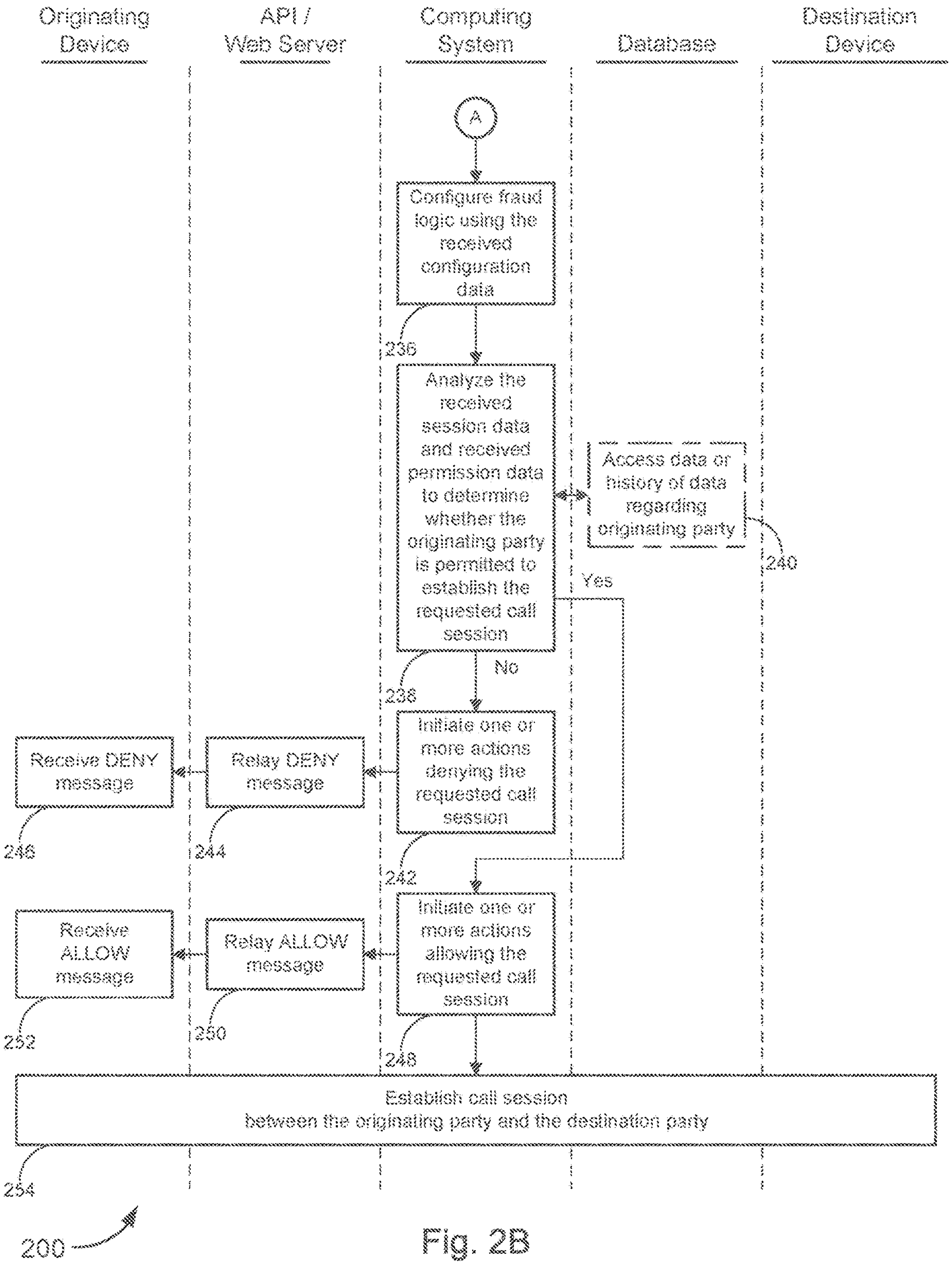

FIGS. 2A and 2B represent a system flow diagram illustrating a non-limiting example 200 of the processes performed at or by components of the system in order to implement web service-based monitoring and detection of fraudulent or unauthorized use of calling service may be implemented, in accordance with various embodiments. Method 200 of FIG. 2A continues onto FIG. 2B following the circular marker denoted, "A."

At block 202, an originating device might send a request to initiate a call session. An application programming interface ("API") and/or a web server might relay request and session data (block 204). At block 206, a computing system might receive the request and session data. The computing system might send a time sensitive token and might a request for username and password to the originating device (block 208). The API and/or web server might relay the time sensitive token and the request for username and password (block 210). At block 212, the originating device might receive the time sensitive token and the request for username and password. If within the time set by the time sensitive token, the originating device might send the username and password entered by an originating party using the originating device (block 214). The API and/or web server might relay the username and password (block 216). At block 218, the computing system might determine whether the username and password are valid. If not, process might continue at block 220. If so, the process might continue at block 224. At block 220, the API and/or web server might relay an error message indicating that the username and/or password are invalid (block 220). At block 222, the originating device might receive the error message. The process might return back to block 214, at which point the originating device might send another username and password entered or re-entered by the originating party using the originating device, if within the time set by the time sensitive token.

At block 224, the computing system might query a database for permission and configuration data. The database might access the permission and configuration data (block 226) and might send the permission and configuration data (block 228). At block 230, the computing system might receive the permission and configuration data. In some embodiments, at optional block 232, the computing system might store, in the database, data regarding the call attempt-including, but not limited to, at least one of the session data, data regarding the originating device, data regarding the originating party, data regarding whether (and how many) invalid username/password entry attempts were made, or data regarding date and time of call attempt, and/or the like. At optional block 234, the database might record the data regarding the call attempt. The process might continue at block 236 in FIG. 2B following the circular marker denoted, "A."

At block 236 in FIG. 2B (following the circular marker denoted, "A"), the computing system might configure fraud logic using the received configuration data. The computing system might analyze the received session data and received permission data to determine whether the originating party is permitted to establish the requested call session (block 238). According to some embodiments, at optional block 240, the computing system might access, from the database, data or a history of data regarding the originating party or the originating device, where the accessed data or history of data may be used in combination with the session data and permission data to determine whether the originating party is permitted to establish the requested call session (at block 238). In some cases, an AI system or machine learning system may be used to facilitate the analysis at block 238. If not, process might continue at block 242. If so, the process might continue at block 248. [Determining whether a call initiated by at least one party constitutes at least one of fraudulent use or unauthorized use (in some cases, based on known propensity for initiating fraudulent calls, the number of times of dial-out or call-out exceeding a threshold amount, etc.), at least in the context of a telephone conferencing system or voice network and in some cases using an AI system or machine learning system, is described in detail in the '712 Application, which has already been incorporated herein by reference in their entirety for all purposes.] At block 242, the computing system might initiate one or more actions (which might correspond to the one or more second actions described above with respect to FIG. 1, or the like) denying the requested call session, which might include sending a message to the originating device indicating that the requested call session has been denied (referred to herein as a "DENY message"). The API and/or web server might relay the DENY message (block 244). At block 246, the originating device might receive the DENY message.

At block 248, the computing system might initiate one or more actions (which might correspond to the one or more first actions described above with respect to FIG. 1, or the like) allowing the requested call session, which might include sending a message to the originating device indicating that the requested call session has been allowed (referred to herein as an "ALLOW message"). The API and/or web server might relay the ALLOW message (block 250). At block 252, the originating device might receive the ALLOW message. The one or more actions might further include establishing the call session between the originating party and the destination party (block 254).

In some embodiments, the originating device might include, but is not limited to, at least one of a telephone, a smart phone, a mobile phone, a tablet computer, a laptop computer, a wearable device, or the like. Similarly, the destination device might include, without limitation, at least one of a telephone, a smart phone, a mobile phone, a tablet computer, a laptop computer, a wearable device, or the like. According to some embodiments, the computing system might include, but is not limited to, at least one of a call server, a network switch, a network hub, a network node, a voice communications system, a video communications system, a multimedia communications system, or a teleconferencing system, and/or the like. In some instances, the call session might include, without limitation, at least one of a voice call session, a video call session, a teleconferencing call session, a video conferencing call session, or a multimedia call session, and/or the like.

According to some embodiments, initiating the one or more first actions might include, but is not limited to, at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party; and/or the like.

In some embodiments, initiating the one or more second actions might include, without limitation, at least one of: sending a message to the first user device indicating that the call session between the originating party and the destination party is denied; denying the call session from being established between the first user device associated with the originating party and a second user device associated with the destination party; blocking initiation of the call session between the first user device associated with the originating party and the second user device associated with the destination party; sending instructions to a call connection system to deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system.

Figure 3:
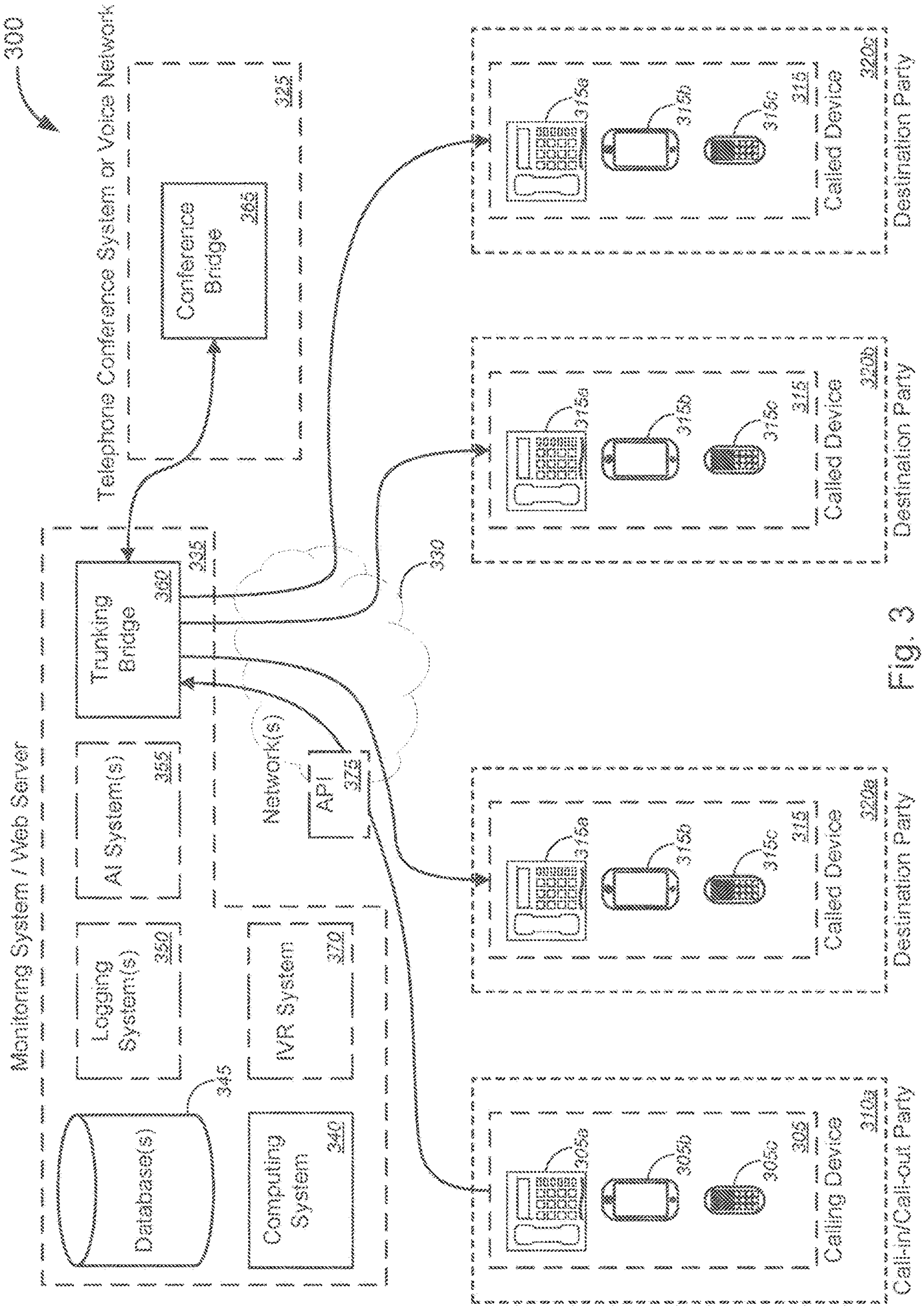
FIG. 3 is a schematic diagram illustrating a non-limiting example of use of a trunking bridge for a telephone conference system or voice network for which web service-based monitoring and detection of fraudulent or unauthorized use of calling service may be implemented, in accordance with various embodiments.

FIG. 3 is a schematic diagram illustrating a non-limiting example 300 of use of a trunking bridge for a telephone conference system or voice network for which web service-based monitoring and detection of fraudulent or unauthorized use of calling service may be implemented, in accordance with various embodiments.

Although FIG. 3 depicts a telephone conference configuration, the various embodiments are not so limited and the use of the trunking bridge (as shown in FIG. 3) may be applicable to any suitable telephone conference configuration examples or any call configuration (including, but not limited to, voice communications configuration video communications configuration, multimedia communications configuration, teleconferencing system configuration, and/or the like), or the like.

In the non-limiting embodiment of FIG. 3, an example 300 of a configuration for monitoring telephone conferencing might comprise a single calling device 305 (each including, but not limited to, at least one of a telephone 305*a*, a smart phone 305*b*, a mobile phone 305*c*, a tablet computer (not shown), a laptop computer (not shown), a wearable device (not shown), or the like) that is associated with or used by a corresponding call-in party 310 to initiate, or participate in, a conference call using telephone conference system or voice network 325 via one or more networks 330 (similar to network(s) 130 of FIG. 1, or the like). As indicated above, the various embodiments of the telephone conference monitoring are not limited to a telephone conference configuration in which a single calling device 305 or single call-in party 310 calling into the telephone conference system or voice network 325, and may be applicable to more than one calling device 305 or call-in party 310 calling into the telephone conference system or voice network 325. The single call-in party 310 (in this case, call-in party 310*a*) might also call-out from the telephone conference system or voice network 325, via network(s) 330, to one or more called devices 315 (each including, but not limited to, at least one of a telephone 315*a*, a smart phone 315*b*, a mobile phone 315*c*, a tablet computer (not shown), a laptop computer (not shown), a wearable device (not shown), or the like) that are associated with or used by corresponding one or more destination parties 320*a*-320*c* (collectively, "destination parties 320" or the like). In particular, the single call-in party 310*a* might dial into or call into a conference bridge 365 provided by the telephone conference system or voice network 325 using a corresponding calling device 305, while also calling out to each called device 315 associated with or used by each corresponding destination party 320*a*-320*c*.

Compared with the configurations as shown in FIG. 1, a monitoring system or web server 335 might be disposed between each calling device 305 or called device 315 and the conference bridge 365 or telephone conference system or voice network 325. Specifically, a trunking bridge 360 of the monitoring system or web server 335 might be disposed between each calling device 305 or called device 315 and the conference bridge 365 or telephone conference system or voice network 325, where all incoming calls to the conference bridge 365 or telephone conference system or voice network 325 are first received by the trunking bridge 360, which then relays the incoming calls to the conference bridge 365 or telephone conference system or voice network 325, and where all outgoing calls from the conference bridge 365 or telephone conference system or voice network 325 are first received by the trunking bridge 360, which then relays the outgoing calls to the called devices 315 associate with or used by each destination party 320*a*-320*c* (as depicted in FIG. 3 by the arrow pointing from the calling device 315 of call-in party 310*a* to the trunking bridge 360 of monitoring system or web server 335 through network(s) 330 (and in some cases, via an application programming interface ("API") 375 (optional)), and the arrows pointing from the trunking bridge 360 through network(s) 330 to each called device 315, with a double-headed arrow pointing between the trunking bridge 360 and the conference bridge 365). In some embodiments, the trunking bridge 360 might include, without limitation, one of a public switched telephone network ("PSTN") trunking bridge, an integrated services digital network ("ISDN") trunking bridge, a voice over Internet protocol ("VoIP") trunking bridge, or a session initiation protocol ("SIP") trunking bridge, and/or the like.

According to some embodiments, the monitoring system or web server 335 might further comprise computing system 340 and corresponding database(s) 345, one or more logging systems 350 (optional), one or more artificial intelligence ("AI") systems 355 (optional), and an interactive voice response ("IVR") system 370 (optional), or the like, in addition to the trunking bridge 360. Herein, although some components of monitoring system or web server 335 are indicated as being optional while others are not, this is merely for the particular embodiment as shown, and, in other embodiments, one or more of the former set of components (or components indicated as being "optional") may be required while one or more of the latter set of components (or components not indicated as being "optional") may in fact be optional.

The computing system 340 (in some cases, in conjunction with use of the AI systems 355) might monitor the call activities of the call-in party 310*a* and the destination parties 320*a*-320*c* using the telephone conference system or voice network 325 by monitoring the network(s) 330 and tracking call connections through the trunking bridge 360 between calling device 305 associated with corresponding call-in party 310*a* and the conference bridge 365 and between the conference bridge 365 and each called device 315 associated with corresponding destination party 320*a*-320*c*. The call activity monitored by the computing system 340 through the trunking bridge 360 either might be stored in database(s) 345 and/or might be logged by logging system(s) 350. In some cases, actions initiated by computing system 340, in response to determining that fraudulent or unauthorized use of the telephone conference system or voice network 325 has been detected, might include routing one or more offending parties 310 or 320 to IVR system 370 to obtain additional information regarding the offending parties and/or to confirm fraudulent or unauthorized use of the telephone conference system or voice network 325 by the one or more offending parties.

Other actions initiated by computing system 340, in response to determining that fraudulent or unauthorized use of the telephone conference system or voice network 325 has been detected, might, but are not limited to, at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system (e.g., database 345 and/or logging system(s) 350, or the like); and/or the like. The use of the trunking bridge 360 may facilitate monitoring call activity and/or initiation of the actions listed above.

The calling device 305, the call-in party 310, the called devices 315, the destination parties 320, the telephone conference system or voice network 325, the network(s) 330, the monitoring system or web server 335, the computing system 340, the database(s) 345, the one or more logging systems 350, the AI systems 355, the conference bridge 365, and the API 375 of FIG. 3 are otherwise similar, if not identical, to the calling devices 105, the originating parties 110, the called devices 115, the destination parties 120, the telephone conference system or voice network 125, the network(s) 130*a*-130*n*, the web server 140, the computing system 145*a* or 145*b*, the database(s) 150*a* or 150*b*, the one or more logging systems 160*a* or 160*b*, and the AI systems 165, the conference bridges 155*a*-155*n*, and API 135 of FIG. 1, and the descriptions of these components of the telephone conference configurations shown in FIG. 3 are applicable to the corresponding components of system 100, respectively.

FIGS. 4A-4G (collectively, "FIG. 4") are flow diagrams illustrating a method for implementing web service-based monitoring and detection of fraudulent or unauthorized use of calling service, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
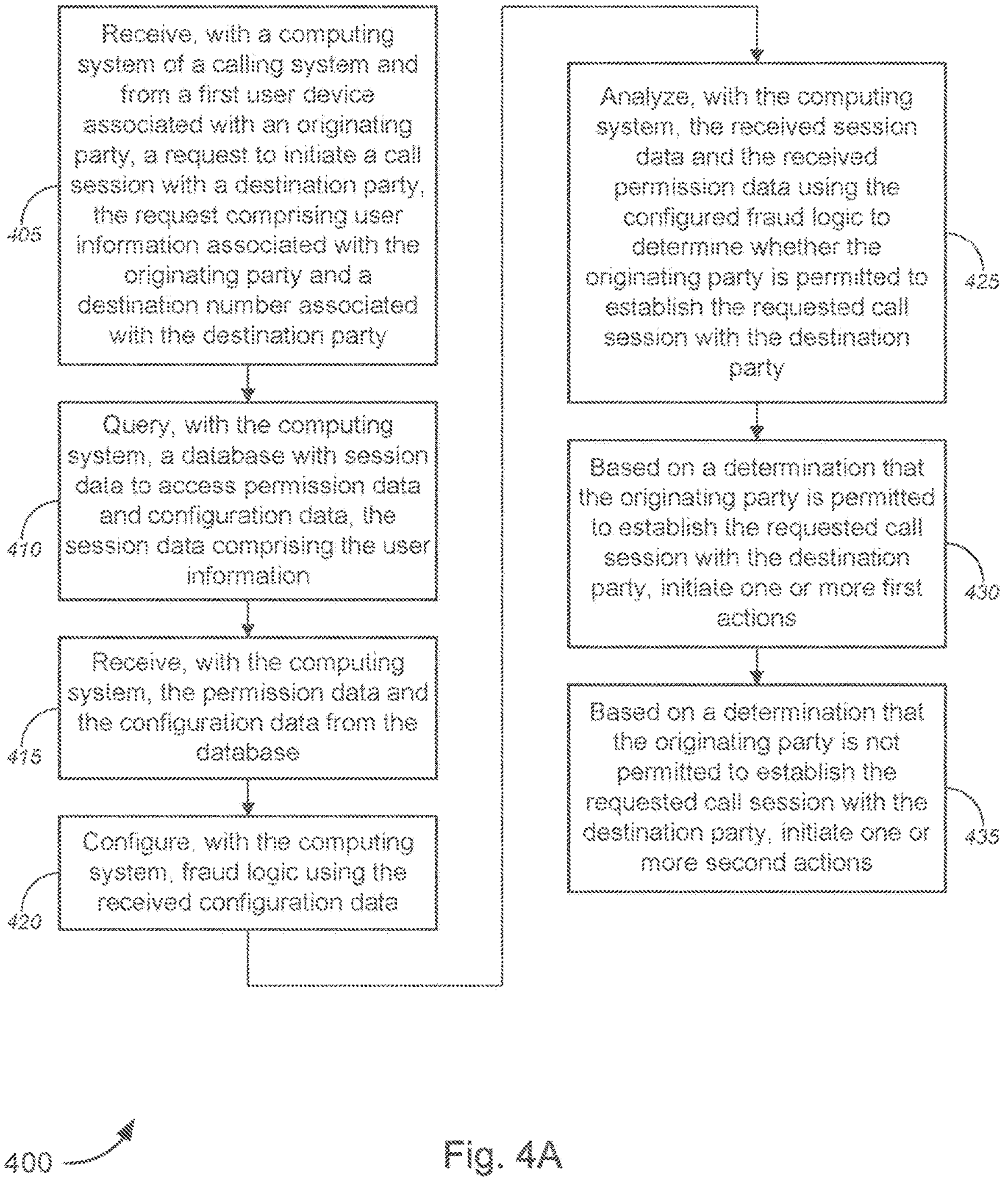
FIGS. 4A-4G are flow diagrams illustrating a method for implementing web service-based monitoring and detection of fraudulent or unauthorized use of calling service, in accordance with various embodiments.

In the non-limiting embodiment of FIG. 4A, method 400, at block 405, might comprise receiving, with a computing system of a calling system and from a first user device associated with an originating party, a request to initiate a call session with a destination party, the request comprising user information associated with the originating party and a destination number associated with the destination party. In some embodiments, the computing system might include, without limitation, at least one of a call server, a network switch, a network hub, a network node, a voice communications system, a video communications system, a multimedia communications system, or a teleconferencing system, and/or the like. In some cases, the call session might include, but is not limited to, at least one of a voice call session, a video call session, a teleconferencing call session, a video conferencing call session, or a multimedia call session, and/or the like.

According to some embodiments, the user information associated with the originating party might include, without limitation, at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of the calling system. In some instances, receiving the request to initiate the call session with the destination party might comprise receiving, with the computing system and from the first user device associated with the originating party via an application programming interface ("API"), the request to initiate the call session with the destination party. Alternatively, or additionally, receiving the request to initiate the call session with the destination party might comprise receiving, with the computing system and from the first user device associated with the originating party via a web service, the request to initiate the call session with the destination party.

At block 410, method 400 might comprise querying, with the computing system, a database with session data to access permission data and configuration data, the session data comprising the user information. Method 400 might further comprise receiving, with the computing system, the permission data and the configuration data from the database (block 415). Method 400 might further comprise, at block 420, configuring, with the computing system, fraud logic using the received configuration data. Method 400 might comprise, at block 425, analyzing, with the computing system, the received session data and the received permission data using the configured fraud logic to determine whether the originating party is permitted to establish the requested call session with the destination party.

Method 400 might further comprise, based on a determination that the originating party is permitted to establish the requested call session with the destination party, initiating one or more first actions (block 430). Alternatively, at block 435, method 400 might comprise, based on a determination that the originating party is not permitted to establish the requested call session with the destination party, initiating one or more second actions.

Figure 4B:
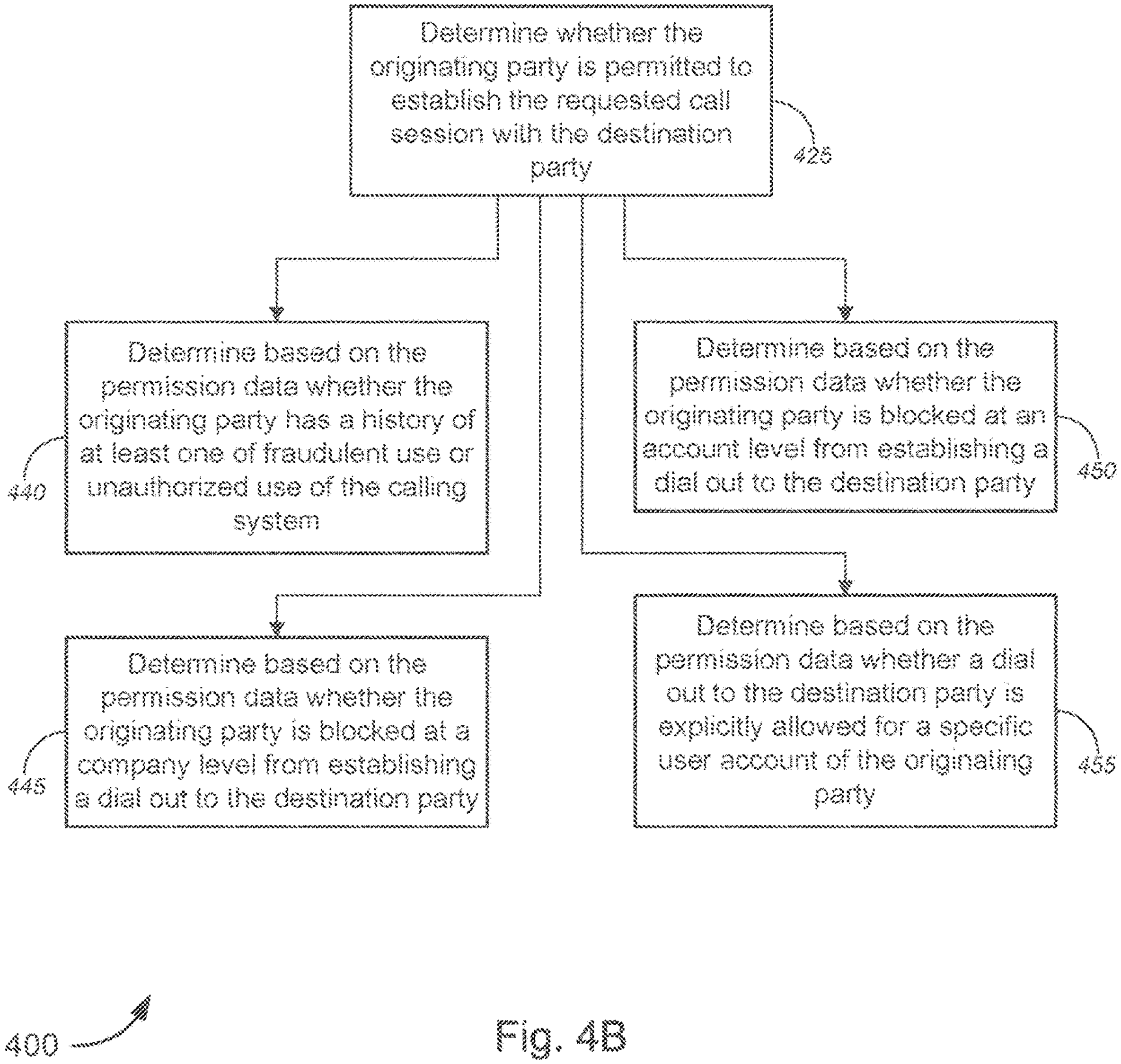

With reference to FIG. 4B, determining whether the originating party is permitted to establish the requested call session with the destination party (at block 425) might comprise at least one of: determining based on the permission data whether the originating party has a history of at least one of fraudulent use or unauthorized use of the calling system (block 440); determining based on the permission data whether the originating party is blocked at a company level from establishing a dial out to the destination party (block 445); determining based on the permission data whether the originating party is blocked at an account level from establishing a dial out to the destination party (block 450); or determining based on the permission data whether a dial out to the destination party is explicitly allowed for a specific user account of the originating party (block 455); and/or the like.

Figure 4C:
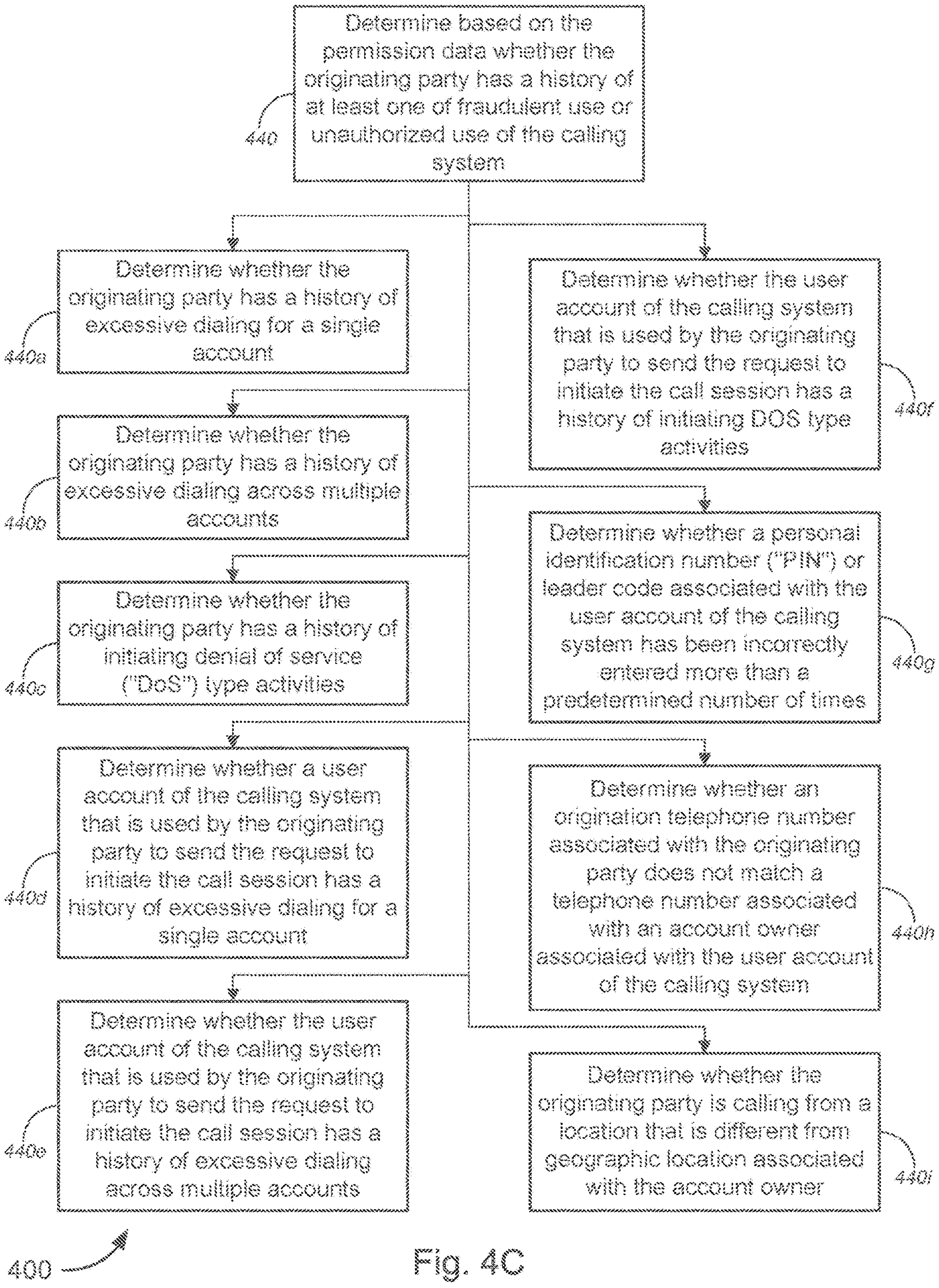

Referring to FIG. 4C, determining based on the permission data whether the originating party has a history of at least one of fraudulent use or unauthorized use of a calling system (at block 440) might comprise at least one of: determining whether the originating party has a history of excessive dialing for a single account (block 440*a*); determining whether the originating party has a history of excessive dialing across multiple accounts (block 440*b*); determining whether the originating party has a history of initiating denial of service ("DoS") type activities (block 440*c*); determining whether a user account of the calling system that is used by the originating party to send the request to initiate the call session has a history of excessive dialing for a single account (block 440*d*); determining whether the user account of the calling system that is used by the originating party to send the request to initiate the call session has a history of excessive dialing across multiple accounts (block 440*e*); determining whether the user account of the calling system that is used by the originating party to send the request to initiate the call session has a history of initiating DOS type activities (block 440*f*); determining whether a personal identification number ("PIN") or leader code associated with the user account of the calling system has been incorrectly entered more than a predetermined number of times (block 440*g*); determining whether an origination telephone number associated with the originating party does not match a telephone number associated with an account owner associated with the user account of the calling system (block 440*h*); or determining whether the originating party is calling from a location that is different from geographic location associated with the account owner (block 440*i*); and/or the like.

Figure 4D:
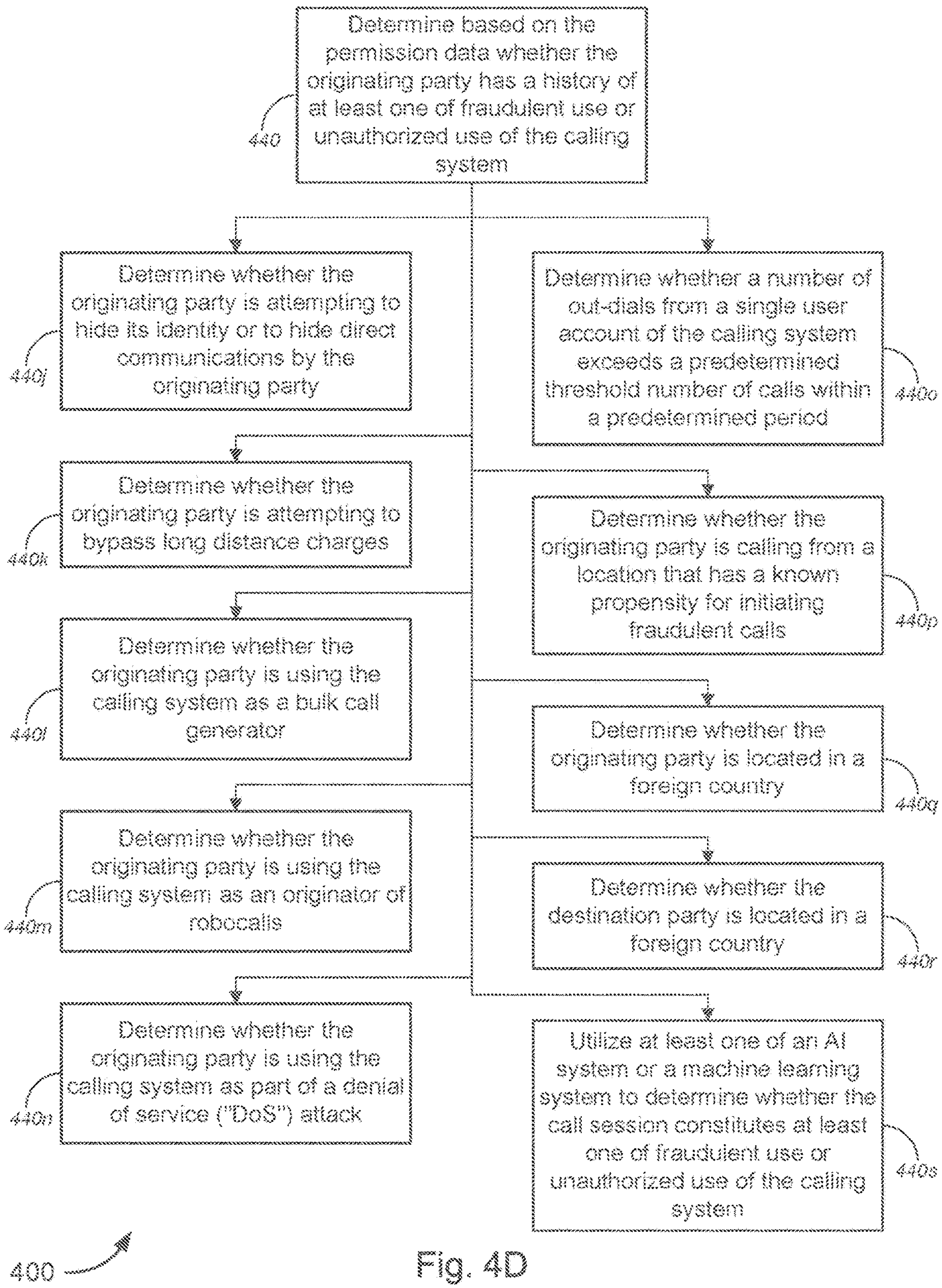

Turning to FIG. 4D, determining based on the permission data whether the originating party has a history of at least one of fraudulent use or unauthorized use of a calling system (at block 440) might alternatively or additionally comprise at least one of: determining whether the originating party is attempting to hide its identity or to hide direct communications by the originating party (block 440*j*); determining whether the originating party is attempting to bypass long distance charges (block 440*k*); determining whether the originating party is using the calling system as a bulk call generator (block 440*l*); determining whether the originating party is using the calling system as an originator of robocalls (block 440*m*); determining whether the originating party is using the calling system as part of a denial of service ("DoS") attack (block 440*n*); determining whether a number of out-dials from a single user account of the calling system exceeds a predetermined threshold number of calls within a predetermined period (block 440*o*); determining whether the originating party is calling from a location that has a known propensity for initiating fraudulent calls (block 440*p*); determining whether the originating party is located in a foreign country (block 440*q*); determining whether the destination party is located in a foreign country (block 440*r*); or utilizing at least one of an artificial intelligence ("AI") system or a machine learning system to determine whether the call session requested by the originating party constitutes at least one of fraudulent use or unauthorized use of the calling system (block 440*s*); and/or the like.

Figure 4E:
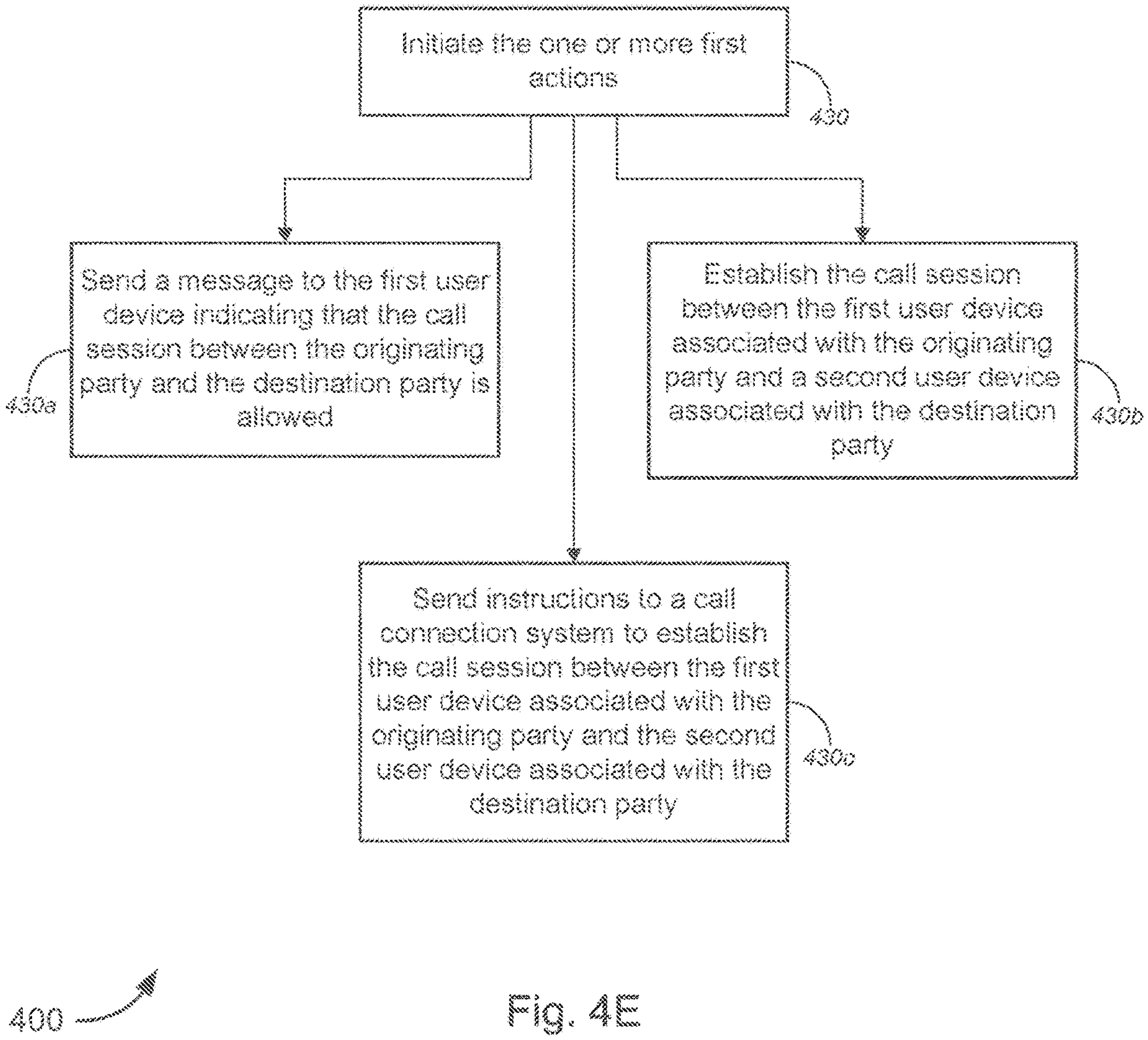

With reference to FIG. 4E, initiating the one or more first actions (at block 430) might comprise at least one of: sending a message to the first user device indicating that the call session between the originating party and the destination party is allowed (block 430*a*); establishing the call session between the first user device associated with the originating party and a second user device associated with the destination party (block 430*b*); or sending instructions to a call connection system to establish the call session between the first user device associated with the originating party and the second user device associated with the destination party (block 430*c*); and/or the like.

Figure 4F:
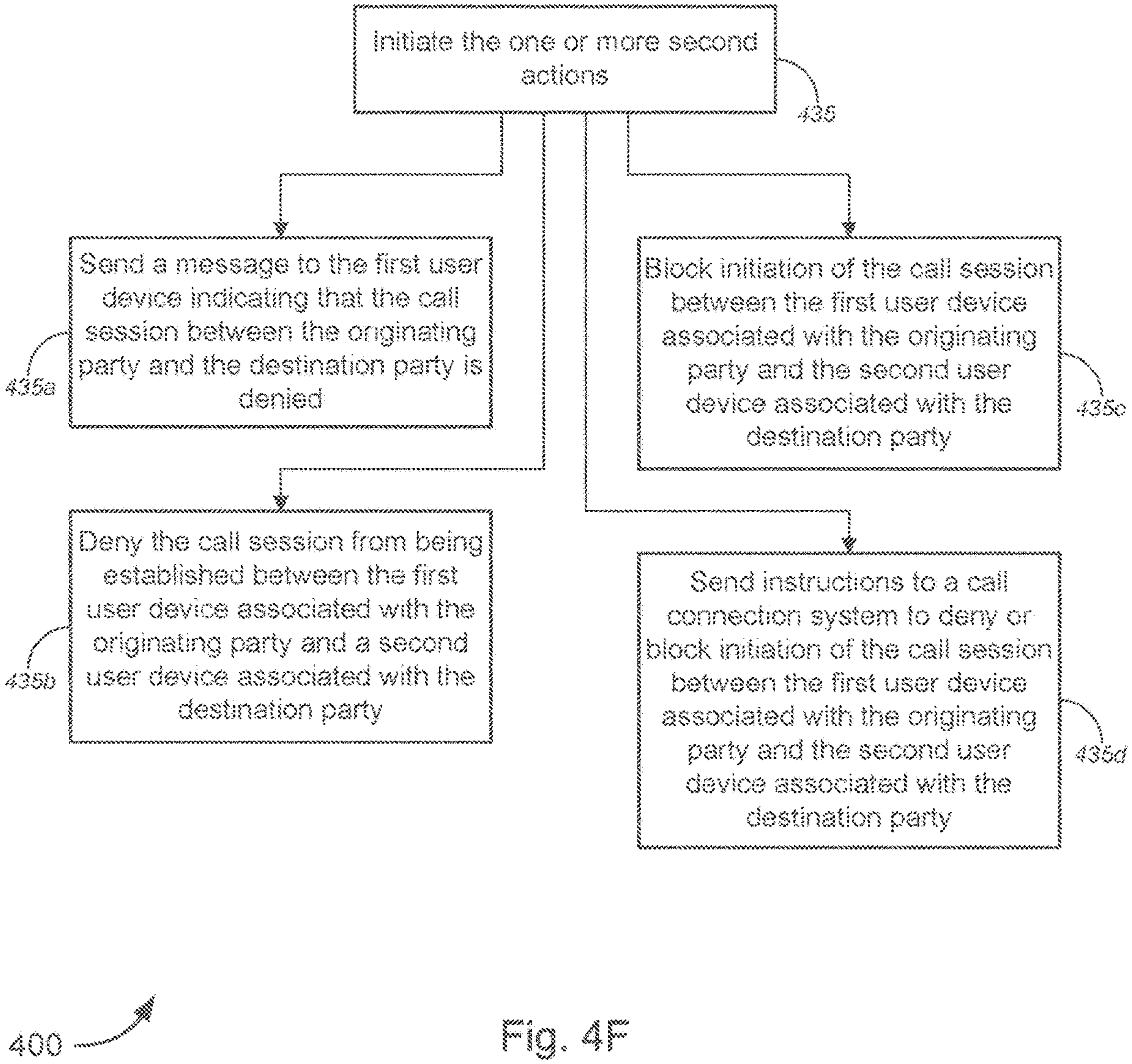

Turning to FIG. 4F, initiating the one or more second actions (at block 435) might comprise at least one of: sending a message to the first user device indicating that the call session between the originating party and the destination party is denied (block 435*a*); denying the call session from being established between the first user device associated with the originating party and a second user device associated with the destination party (block 435*b*); blocking initiation of the call session between the first user device associated with the originating party and the second user device associated with the destination party (block 435*c*); or sending instructions to a call connection system to deny or block initiation of the call session between the first user device associated with the originating party and the second user device associated with the destination party (block 435*d*); and/or the like.

Figure 4G:
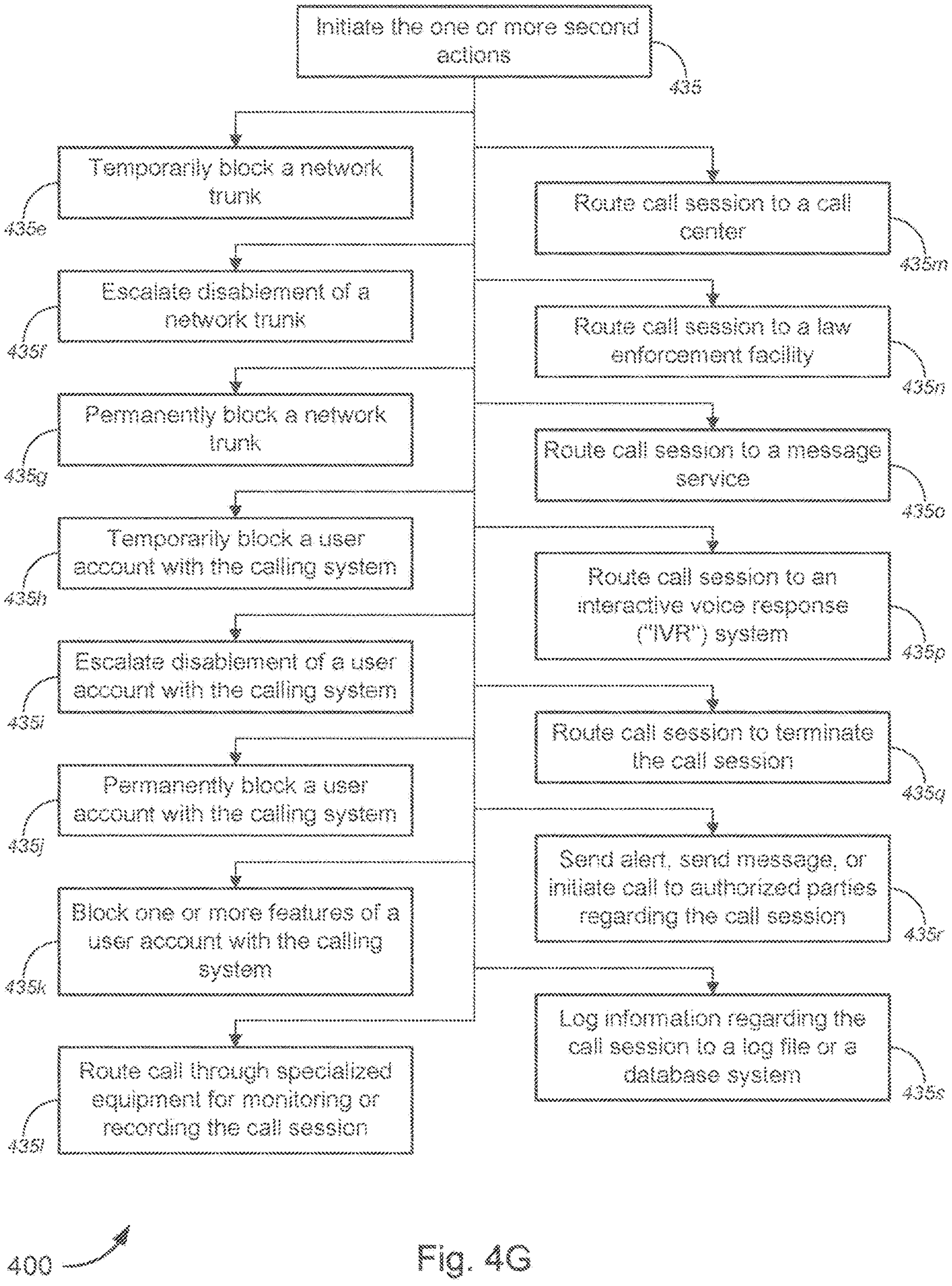

Referring to FIG. 4G, initiating the one or more second actions (at block 435) might alternatively or additionally comprise at least one of: temporarily blocking a network trunk (block 435*e*); escalating disablement of a network trunk (block 435*f*); permanently blocking a network trunk (block 435*g*); temporarily blocking a user account with the calling system (block 435*h*); escalating disablement of a user account with the calling system (block 435*i*); permanently blocking a user account with the calling system (block 435*j*); blocking one or more features of a user account with the calling system (block 435*k*); changing routing of the call session to route through specialized equipment for monitoring or recording the call session (block 435*l*); changing routing of the call session to route to a call center (block 435*m*); changing routing of the call session to route to a law enforcement facility (block 435*n*); changing routing of the call session to route to a message service (block 435*o*); changing routing of the call session to route to an interactive voice response ("IVR") system (block 435*p*); changing routing of the call session to terminate the call session (block 435*q*); sending alert(s), sending message(s), or initiating call(s) to authorized parties regarding the call session (block 435*r*); or logging information regarding the call session to a log file or a database system (block 435*s*); and/or the like.

In some cases, sending alert(s), sending message(s), or initiating call(s) to authorized parties regarding the call might include, without limitation, at least one of sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; and/or the like.

In some instances, at least one of the alert, the e-mail message, the SMS message, the text message, or the telephone call might comprise at least one of an option to block access to the account by the at least one party, an option to change account credentials associated with the account, an option to contact the account owner, or an option to disconnect the call, and/or the like, based at least in part on a determination that the call is deemed by the at least one of the account owner, the account manager, the call center representative, or the law enforcement representative to be at least one of fraudulent use or unauthorized use of the telephone conferencing system or voice network.

Exemplary System and Hardware Implementation

Figure 5:
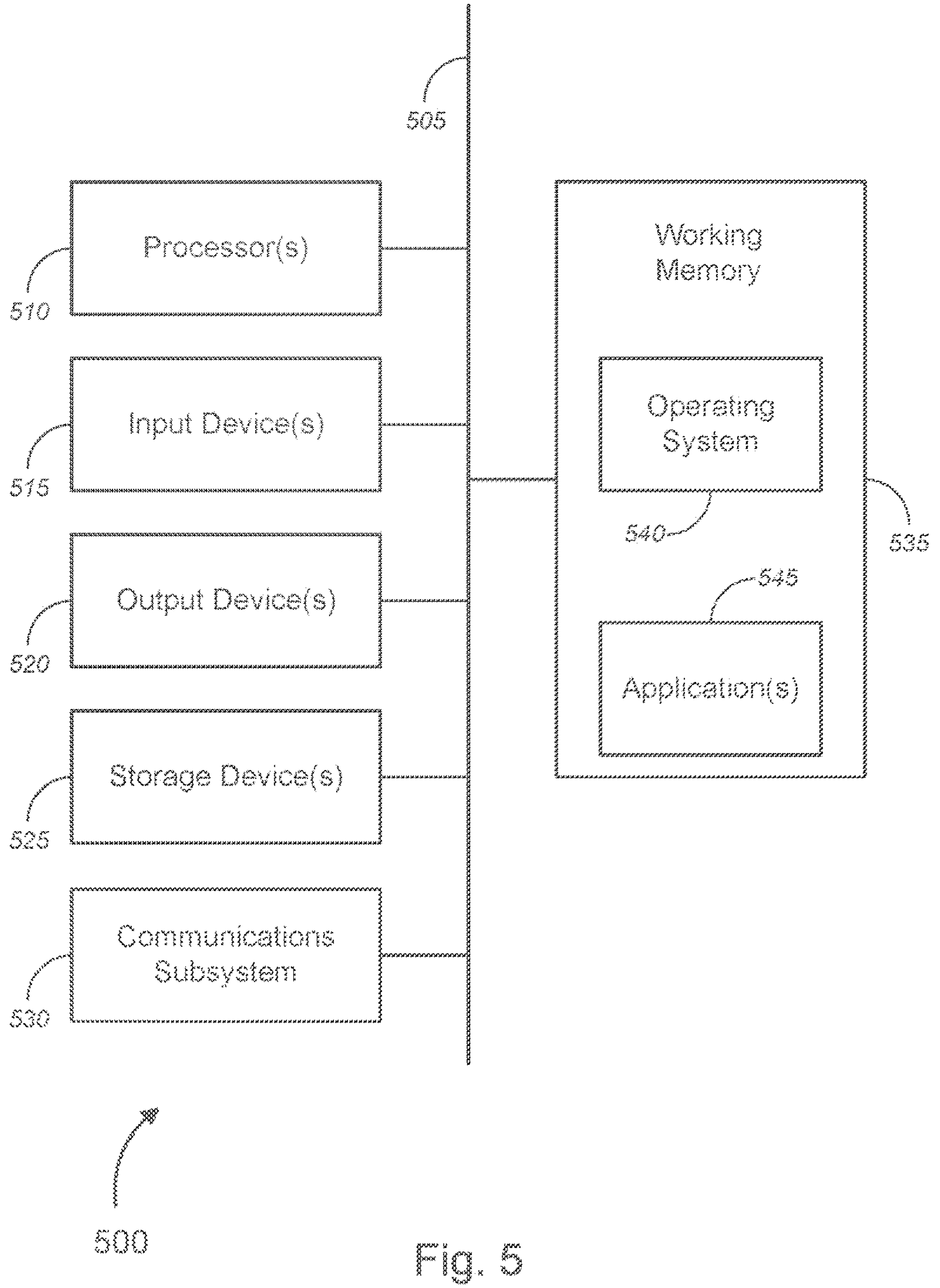
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., calling devices 105 and 305, called devices 115 and 315, web servers 140 and 335, computing systems 145*a*, 145*b*, and 340, logging systems 160*a*, 160*b*, and 350, artificial intelligence ("AI") systems 165 and 355, and interactive voice response ("IVR") system 370, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., calling devices 105 and 305, called devices 115 and 315, web servers 140 and 335, computing systems 145*a*, 145*b*, and 340, logging systems 160*a*, 160*b*, and 350, AI systems 165 and 355, and IVR system 370, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
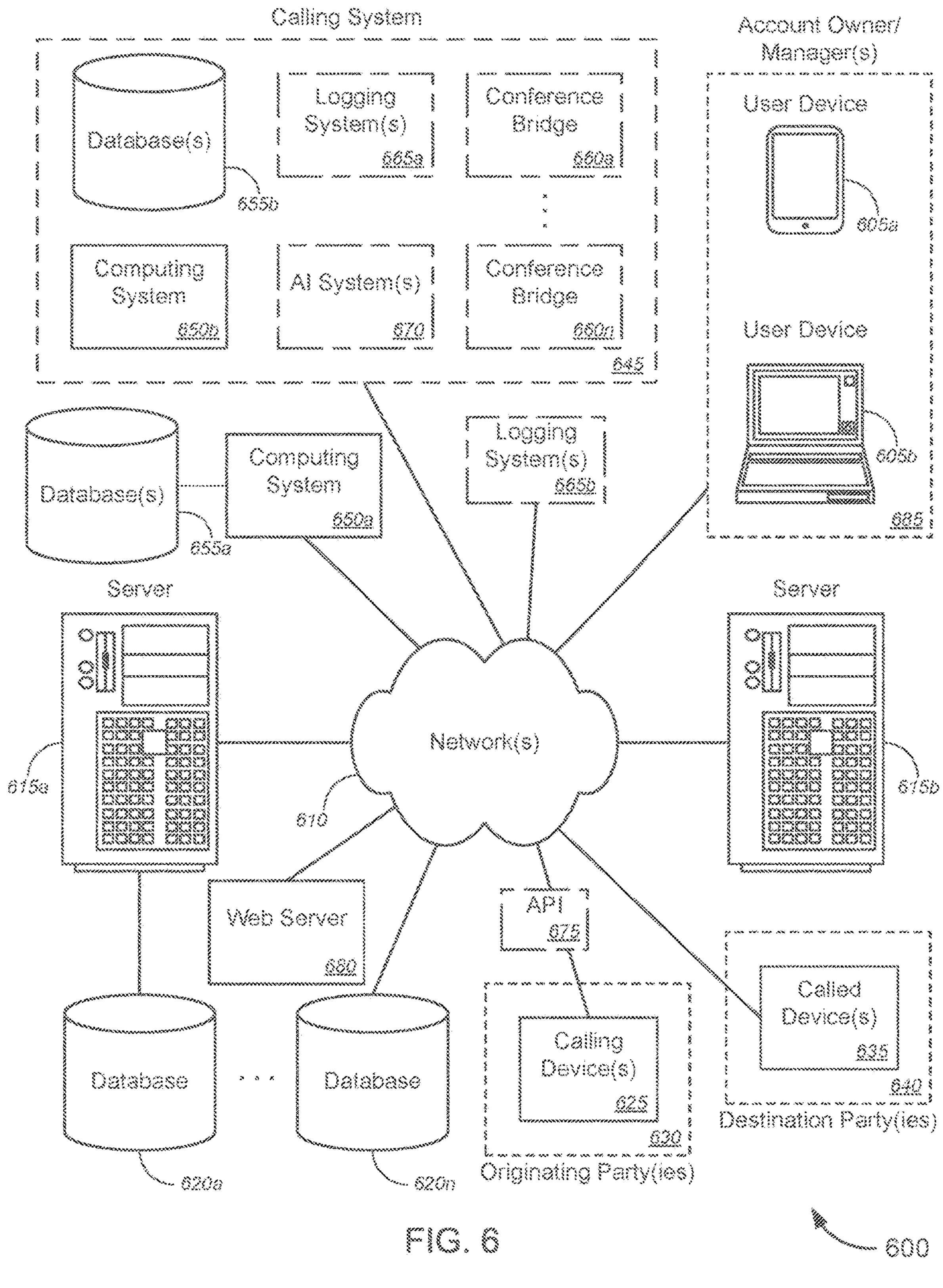
FIG. 6 is a block diagram illustrating a networked system of computers, computing systems, or system hardware architecture, which can be used in accordance with various embodiments.

As noted above, a set of embodiments comprises methods and systems for implementing monitoring and detection of fraudulent or unauthorized use, and, more particularly, to methods, systems, and apparatuses for implementing web service-based monitoring and detection of fraudulent or unauthorized use of calling service. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 130*a*-130*n* and 330 FIGS. 1 and 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing monitoring and detection of fraudulent or unauthorized use, and, more particularly, to methods, systems, and apparatuses for implementing web service-based monitoring and detection of fraudulent or unauthorized use of calling service, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a calling device(s) 625 (similar to calling devices 105 and 305 of FIGS. 1 and 3, or the like) associated with each of one or more corresponding originating parties 630 (similar to originating parties 110 or 310 of FIGS. 1 and 3, or the like) and a called device(s) 635 (similar to called devices 115 and 315 of FIGS. 1 and 3, or the like) associated with each of one or more corresponding destination parties 640 (similar to destination parties 120 and 320 of FIGS. 1 and 3, or the like). System 600 might further comprise calling system 645 (similar to calling system or telephone conference system or voice networks 125 and 325 of FIGS. 1 and 3, or the like), computing system 650*a* and corresponding database(s) 655*a* (similar to computing systems 145*a* and 340 and corresponding database(s) 150*a* and 345 of FIGS. 1 and 3, or the like), computing system 650*b* and corresponding database(s) 655*b* (similar to computing system 145*b* and 340 and corresponding database(s) 150*b* and 345 of FIG. 1, or the like). Computing system 650*a* and corresponding database(s) 655*a* might be disposed external to calling system or telephone conference system or voice network 645, while computing system 650*b* and corresponding database(s) 655*b* might be disposed within calling system or telephone conference system or voice network 645. System 600 might further comprise one or more conference bridges 660*a*-660*n* (similar to conference bridges 155*a*-155*n* and 365 of FIGS. 1 and 3, or the like), one or more logging systems 665*a* (optional; similar to logging systems 160*a* and 350 of FIGS. 1 and 3, or the like), and one or more artificial intelligence ("AI") systems 670 (optional; similar to AI systems 165 and 355 of FIGS. 1 and 3, or the like), each of which may be disposed within calling system or telephone conference system or voice network 645. System 600 might further comprise one or more logging systems 665*b* (optional; similar to logging systems 160*b* and 350 of FIGS. 1 and 3, or the like) that may be disposed external to calling system or telephone conference system or voice network 645.

In operation, computing system 650*a*, computing system 650*b*, web server 680, or a monitoring system (such as monitoring system or web server 335 of FIG. 3, or the like) (collectively, "computing system" or the like) might receive, from a first user device associated with an originating party (e.g., originating party 630, or the like), a request to initiate a call session with a destination party (e.g., destination party 640, or the like), the request comprising user information associated with the originating party and a destination number associated with the destination party; might query a database with session data to access permission data and configuration data, the session data comprising the user information; might receive the permission data and the configuration data from the database; and might configure fraud logic using the received configuration data. The computing system might analyze the received session data and the received permission data using the configured fraud logic to determine whether the originating party is permitted to establish the requested call session with the destination party; based on a determination that the originating party is permitted to establish the requested call session with the destination party, might initiate one or more first actions; and, based on a determination that the originating party is not permitted to establish the requested call session with the destination party, might initiate one or more second actions.

In some embodiments, the call session might include, without limitation, at least one of a voice call session, a video call session, a teleconferencing call session, a video conferencing call session, or a multimedia call session, and/or the like. In some instances, the user information associated with the originating party might include, but is not limited to, at least one of a username, a user identifier, an account identifier, an origination number, a password, a passcode, a session code, a personal identification number ("PIN") code, a leader code, geographic location information, or Internet protocol ("IP") address, and/or the like, each associated with at least one of the originating party or a user account of the calling system. In some cases, receiving the request to initiate the call session with the destination party might comprise receiving, with the computing system and from the first user device associated with the originating party via an application programming interface ("API"), the request to initiate the call session with the destination party. Alternatively, or additionally, receiving the request to initiate the call session with the destination party might comprise receiving, with the computing system and from the first user device associated with the originating party via a web service, the request to initiate the call session with the destination party.

According to some embodiments, determining whether the originating party is permitted to establish the requested call session with the destination party might comprise at least one of: determining based on the permission data whether the originating party has a history of at least one of fraudulent use or unauthorized use of the calling system; determining based on the permission data whether the originating party is blocked at a company level from establishing a dial out to the destination party; determining based on the permission data whether the originating party is blocked at an account level from establishing a dial out to the destination party; or determining based on the permission data whether a dial out to the destination party is explicitly allowed for a specific user account of the originating party; and/or the like.

In some embodiments, determining based on the permission data whether the originating party has a history of at least one of fraudulent use or unauthorized use of a calling system might comprise at least one of: determining whether the originating party has a history of excessive dialing for a single account; determining whether the originating party has a history of excessive dialing across multiple accounts; determining whether the originating party has a history of initiating denial of service ("DoS") type activities; determining whether a user account of the calling system that is used by the originating party to send the request to initiate the call session has a history of excessive dialing for a single account; determining whether the user account of the calling system that is used by the originating party to send the request to initiate the call session has a history of excessive dialing across multiple accounts; determining whether the user account of the calling system that is used by the originating party to send the request to initiate the call session has a history of initiating DOS type activities; determining whether a personal identification number ("PIN") or leader code associated with the user account of the calling system has been incorrectly entered more than a predetermined number of times; determining whether an origination telephone number associated with the originating party does not match a telephone number associated with an account owner associated with the user account of the calling system; or determining whether the originating party is calling from a location that is different from geographic location associated with the account owner; and/or the like.

In some cases, determining based on the permission data whether the originating party has a history of at least one of fraudulent use or unauthorized use of a calling system might alternatively or additionally comprise at least one of: determining whether the originating party is attempting to hide its identity or to hide direct communications by the originating party; determining whether the originating party is attempting to bypass long distance charges; determining whether the originating party is using the calling system as a bulk call generator; determining whether the originating party is using the calling system as an originator of robocalls; determining whether the originating party is using the calling system as part of a denial of service ("DoS") attack; determining whether a number of out-dials from a single user account of the calling system exceeds a predetermined threshold number of calls within a predetermined period; determining whether the originating party is calling from a location that has a known propensity for initiating fraudulent calls; determining whether the originating party is located in a foreign country; determining whether the destination party is located in a foreign country; or utilizing at least one of an artificial intelligence ("AI") system or a machine learning system to determine whether the call session requested by the originating party constitutes at least one of fraudulent use or unauthorized use of the calling system; and/or the like.

According to some embodiments, initiating the one or more first actions might include, but is not limited to, at least one of: sending a message to the first user device indicating that the call session between the originating party and the destination party is allowed; establishing the call session between the first user device associated with the originating party and a second user device associated with the destination party; or sending instructions to a call connection system to establish the call session between the first user device associated with the originating party and the second user device associated with the destination party; and/or the like.

In some embodiments, initiating the one or more second actions might include, without limitation, at least one of: sending a message to the first user device indicating that the call session between the originating party and the destination party is denied; denying the call session from being established between the first user device associated with the originating party and a second user device associated with the destination party; blocking initiation of the call session between the first user device associated with the originating party and the second user device associated with the destination party; sending instructions to a call connection system to deny or block initiation of the call session between the first user device associated with the originating party and the second user device associated with the destination party; temporarily blocking a network trunk; escalating disablement of a network trunk; permanently blocking a network trunk; temporarily blocking a user account with the calling system; escalating disablement of a user account with the calling system; permanently blocking a user account with the calling system; blocking one or more features of a user account with the calling system; changing routing of the call session to route through specialized equipment for monitoring or recording the call session; changing routing of the call session to route to a call center; changing routing of the call session to route to a law enforcement facility; changing routing of the call session to route to a message service; changing routing of the call session to route to an interactive voice response ("IVR") system; changing routing of the call session to terminate the call session; sending an alert regarding the call session to at least one of a user account owner, a user account manager, a call center representative, or a law enforcement representative; sending an e-mail message regarding the call session to at least one of a user account owner, a user account manager, a call center representative, or a law enforcement representative; sending a short message service ("SMS") message regarding the call session to at least one of a user account owner, a user account manager, a call center representative, or a law enforcement representative; sending a text message regarding the call session to at least one of a user account owner, a user account manager, a call center representative, or a law enforcement representative; initiating a telephone call regarding the call session to at least one of a user account owner, a user account manager, a call center representative, or a law enforcement representative; or logging information regarding the call session to a log file or a database system.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, with a computing system of a calling system and from a first user device associated with an originating party, a request to initiate a call session with a destination party, the request comprising user information associated with the originating party and a destination number associated with the destination party;

querying, with the computing system, a database with session data to access permission data and configuration data, the session data comprising the user information;

receiving, with the computing system, the permission data and the configuration data from the database;

configuring, with the computing system, fraud logic using the received configuration data;

analyzing, with the computing system, the received session data and the received permission data using the configured fraud logic to determine whether the originating party is permitted to establish the requested call session with the destination party;

based on a determination that the originating party is permitted to establish the requested call session with the destination party, initiating one or more first actions; and based on a determination that the originating party is not permitted to establish the requested call session with the destination party, initiating one or more second actions, wherein initiating the one or more second actions comprise at least one of:

temporarily blocking a network trunk;

escalating disablement of a network trunk; and permanently blocking a network trunk.

2. The method of claim 1, wherein the computing system comprises at least one of a call server, a network switch, a network hub, a network node, a voice communications system, a video communications system, a multimedia communications system, or a teleconferencing system.

3. The method of claim 1, wherein the call session comprises at least one of a voice call session, a video call session, a teleconferencing call session, a video conferencing call session, or a multimedia call session.

4. The method of claim 1, wherein the user information associated with the originating party comprises at least one of a username, a user identifier, an account identifier, an origination number, a password, a passcode, a session code, a personal identification number ("PIN") code, a leader code, geographic location information, or Internet protocol ("IP") address, each associated with at least one of the originating party or a user account of the calling system.

5. The method of claim 1, wherein receiving the request to initiate the call session with the destination party comprises receiving, with the computing system and from the first user device associated with the originating party via an application programming interface ("API"), the request to initiate the call session with the destination party.

6. The method of claim 1, wherein receiving the request to initiate the call session with the destination party comprises receiving, with the computing system and from the first user device associated with the originating party via a web service, the request to initiate the call session with the destination party.

7. The method of claim 1, wherein determining whether the originating party is permitted to establish the requested call session with the destination party comprises at least one of:

determining based on the permission data whether the originating party is blocked at a company level from establishing a dial out to the destination party; or determining based on the permission data whether the originating party is blocked at an account level from establishing a dial out to the destination party.

8. The method of claim 1, wherein initiating the one or more first actions comprise at least one of:

sending a message to the first user device indicating that the call session between the originating party and the destination party is allowed;

establishing the call session between the first user device associated with the originating party and a second user device associated with the destination party; or sending instructions to a call connection system to establish the call session between the first user device associated with the originating party and the second user device associated with the destination party.

9. The method of claim 1, wherein initiating the one or more second actions further comprise at least one of:

sending a message to the first user device indicating that the call session between the originating party and the destination party is denied;

denying the call session from being established between the first user device associated with the originating party and a second user device associated with the destination party;

blocking initiation of the call session between the first user device associated with the originating party and the second user device associated with the destination party;

sending instructions to a call connection system to deny or block initiation of the call session between the first user device associated with the originating party and the second user device associated with the destination party;

temporarily blocking a user account with the calling system;

escalating disablement of a user account with the calling system;

permanently blocking a user account with the calling system;

blocking one or more features of a user account with the calling system;

changing routing of the call session to route to a call center;

changing routing of the call session to route to a law enforcement facility;

changing routing of the call session to route to a message service;

changing routing of the call session to route to an interactive voice response ("IVR") system;

changing routing of the call session to terminate the call session;

sending an alert regarding the call session to at least one of a user account owner, a user account manager, a call center representative, or a law enforcement representative;

sending an e-mail message regarding the call session to at least one of a user account owner, a user account manager, a call center representative, or a law enforcement representative;

sending a short message service ("SMS") message regarding the call session to at least one of a user account owner, a user account manager, a call center representative, or a law enforcement representative;

sending a text message regarding the call session to at least one of a user account owner, a user account manager, a call center representative, or a law enforcement representative;

initiating a telephone call regarding the call session to at least one of a user account owner, a user account manager, a call center representative, or a law enforcement representative; or logging information regarding the call session to a log file or a database system.

10. An apparatus of a calling system, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive, from a first user device associated with a originating party, a request to initiate a call session with a destination party, the request comprising user information associated with the originating party and a destination number associated with the destination party;

query a database with session data to access permission data and configuration data, the session data comprising the user information;

receive the permission data and the configuration data from the database;

configure fraud logic using the received configuration data;

analyze the received session data and the received permission data using the configured fraud logic to determine whether the originating party is permitted to establish the requested call session with the destination party;

based on a determination that the originating party is permitted to establish the requested call session with the destination party, initiate one or more first actions; and based on a determination that the originating party is not permitted to establish the requested call session with the destination party, initiate one or more second actions, wherein initiating the one or more second actions comprises at least one of:

temporarily blocking a network trunk;

escalating disablement of a network trunk; and permanently blocking a network trunk.

11. A system, comprising:

a computing system of a calling system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, from a first user device associated with a originating party, a request to initiate a call session with a destination party, the request comprising user information associated with the originating party and a destination number associated with the destination party;

query a database with session data to access permission data and configuration data, the session data comprising the user information;

receive the permission data and the configuration data from the database;

configure fraud logic using the received configuration data;

analyze the received session data and the received permission data using the configured fraud logic to determine whether the originating party is permitted to establish the requested call session with the destination party;

based on a determination that the originating party is permitted to establish the requested call session with the destination party, initiate one or more first actions; and based on a determination that the originating party is not permitted to establish the requested call session with the destination party, initiate one or more second actions, wherein initiating the one or more second actions comprises at least one of:

temporarily blocking a network trunk;

escalating disablement of a network trunk; and permanently blocking a network trunk.

12. The system of claim 11, wherein the computing system comprises at least one of a call server, a network switch, a network hub, a network node, a voice communications system, a video communications system, a multimedia communications system, or a teleconferencing system.

13. The system of claim 11, wherein the call session comprises at least one of a voice call session, a video call session, a teleconferencing call session, a video conferencing call session, or a multimedia call session.

14. The system of claim 11, wherein the user information associated with the originating party comprises at least one of a username, a user identifier, an account identifier, an origination number, a password, a passcode, a session code, a personal identification number ("PIN") code, a leader code, geographic location information, or Internet protocol ("IP") address, each associated with at least one of the originating party or a user account of the calling system.

15. The system of claim 14, wherein determining based on the permission data whether the originating party has a history of at least one of fraudulent use or unauthorized use of a telephone conferencing system or a voice network comprises utilizing at least one of an artificial intelligence ("AI") system or a machine learning system to determine whether the call session requested by the originating party constitutes at least one of fraudulent use or unauthorized use of the calling system.

16. The system of claim 11, wherein the one or more first actions comprise at least one of:

sending a message to the first user device indicating that the call session between the originating party and the destination party is allowed;

establishing the call session between the first user device associated with the originating party and a second user device associated with the destination party; or sending instructions to a call connection system to establish the call session between the first user device associated with the originating party and the second user device associated with the destination party.

17. The system of claim 11, wherein the one or more second actions further comprise at least one of:

sending a message to the first user device indicating that the call session between the originating party and the destination party is denied;

denying the call session from being established between the first user device associated with the originating party and a second user device associated with the destination party;

blocking initiation of the call session between the first user device associated with the originating party and the second user device associated with the destination party;

sending instructions to a call connection system deny or block initiation of the call session between the first user device associated with the originating party and the second user device associated with the destination party;

temporarily blocking a user account with the calling system;

escalating disablement of a user account with the calling system;

permanently blocking a user account with the calling system;

blocking one or more features of a user account with the calling system;

changing routing of the call session to route to a call center;

changing routing of the call session to route to a law enforcement facility;

changing routing of the call session to route to a message service;

changing routing of the call session to route to an interactive voice response ("IVR") system;

changing routing of the call session to terminate the call session;

sending an alert regarding the call session to at least one of a user account owner, a user account manager, a call center representative, or a law enforcement representative;

sending an e-mail message regarding the call session to at least one of a user account owner, a user account manager, a call center representative, or a law enforcement representative;

sending a short message service ("SMS") message regarding the call session to at least one of a user account owner, a user account manager, a call center representative, or a law enforcement representative;

sending a text message regarding the call session to at least one of a user account owner, a user account manager, a call center representative, or a law enforcement representative;

initiating a telephone call regarding the call session to at least one of a user account owner, a user account manager, a call center representative, or a law enforcement representative; or logging information regarding the call session to a log file or a database system.

* * * * *